United States Patent

Snyder et al.

[11] Patent Number: 6,038,561
[45] Date of Patent: Mar. 14, 2000

[54] MANAGEMENT AND ANALYSIS OF DOCUMENT INFORMATION TEXT

[75] Inventors: David L. Snyder, Pittsford; Randall J. Calistri-Yeh, Webster, both of N.Y.

[73] Assignee: Manning & Napier Information Services, Rochester, N.Y.

[21] Appl. No.: 08/929,603

[22] Filed: Sep. 15, 1997

Related U.S. Application Data

[60] Provisional application No. 60/028,437, Oct. 15, 1996.

[51] Int. Cl.[7] .................................................. G06F 17/30
[52] U.S. Cl. .................. 707/6; 707/2; 707/3; 707/10; 707/522
[58] Field of Search ................................. 707/9, 10, 6, 1, 707/2, 3, 4, 5

[56] References Cited

U.S. PATENT DOCUMENTS

| | | | |
|---|---|---|---|
| 4,736,308 | 4/1988 | Heckel | 364/200 |
| 4,788,538 | 11/1988 | Klein et al. | 340/747 |
| 5,433,199 | 7/1995 | Cline et al. | 128/653.1 |
| 5,442,778 | 8/1995 | Pedersen et al. | 707/10 |
| 5,483,650 | 1/1996 | Pedersen et al. | 707/10 |
| 5,622,178 | 4/1997 | Gilham | 128/696 |
| 5,623,679 | 4/1997 | Rivette et al. | 707/3 |
| 5,623,681 | 4/1997 | Rivette et al. | 707/522 |
| 5,675,819 | 10/1997 | Schuetze | 395/760 |
| 5,696,963 | 12/1997 | Ahn | 707/51 R |
| 5,754,840 | 5/1998 | Rivette et al. | 395/709 |
| 5,761,661 | 6/1998 | Coussens et al. | 707/9 |
| 5,787,422 | 7/1998 | Tukey et al. | 707/5 |
| 5,799,325 | 8/1998 | Rivette et al. | 707/579 |
| 5,806,079 | 9/1998 | Rivette et al. | 707/500 |
| 5,809,318 | 9/1998 | Rivette et al. | 707/2 |
| 5,845,301 | 12/1998 | Rivette et al. | 707/5 |
| 5,848,409 | 12/1998 | Ahn | 707/526 |

FOREIGN PATENT DOCUMENTS

0561241 A2  9/1993  European Pat. Off. ............ 15/40

OTHER PUBLICATIONS

Liddy, E.D., Paik, W., Yu, E.S. & McVearry, K., "An overview of DR–LINK and its approach to document filtering," *Proceedings of the ARPA Workshop on Human Language Technology* (1993).

Liddy, E.D. & Myaeng, S.H., "DR–LINK System: Phase I Summary." *Proceedings of the TIPSTER Phase I Final Report*, (1994).

Liddy, E.D., Paik, W., Yu, E.S. & McKenna, M., "Document retrieval using linguistic knowledge." *Proceedings of RIAO '94 Conference*, (1994).

Liddy, E.D., Paik, W., Yu, E.S., "Text categorization for multiple users based on semantic information from an MRD." *ACM Transactions on Information Systems*. Publication date: 1994. Presentation date: (1994).

Liddy, E.D., Paik, W., McKenna, M. & Yu, E.S., "A natural language text retrieval system with relevance feedback." *Proceedings of the 16th National Online Meeting*, (1995).

Paik, W., Liddy, E.D., Yu, E.S. & McKenna, M., "Categorizing and standardizing proper nouns for efficient information retrieval." *Proceedings of the ACL Workshop on Acquisition of Lexical Knowledge from Text*, (1993).

Paik, W., Liddy, E.D., Yu, E.S. & McKenna, M., "Interpretation of Proper Nouns for Information Retrieval." *Proceedings of the ARPA Workshop on Human Language Technology*, (1993).

Salton, G. and Buckley, C. "Term–weighting Approaches in Automatic Text Retrieval." *Information Processing and Management*. vol. 24, 513–523. Publication date: (1988) ("Salton reference").

Primary Examiner—Wayne Amsbury
Assistant Examiner—Shahid Alam
Attorney, Agent, or Firm—Townsend and Townsend and Crew LLP

[57] ABSTRACT

An interactive system for analyzing and displaying information contained in a plurality of documents employing both term-based analysis and conceptual-representation analysis. Particulars of the invention are especially effective for analyzing patent texts, such as patent claims, abstracts and other portions of a patent document.

68 Claims, 35 Drawing Sheets

Signing On

Figure 1.1 The MAPIT Sign-on Screen:
Showing the Netscape Secure Server version
of the system.

909

Netscape - [MAPIT]

File Edit View Go Bookmarks Options Directory Window Help

[Back] [Forward] [Home] [Reload] [Image] [Open] [Print] [Find] [Stop]

MAPIT info

Datasets

Analytics

Canvas

Prefs

Help

Feedback

Analytics: 18 patents on beertaps

Queries | Concept Query | Patent Query | Claim Query | Range Query
Visualizations

Concept Query Review

| Stemmed Words and Phrases | # Claims | # Patents |
|---|---|---|
| connect | 76 | 10 |
| gas pressure source | 5 | 2 |
| gas pressure | 29 | 6 |
| gas | 262 | 17 |
| pressure source | 10 | 2 |
| pressure | 59 | 8 |
| source | 38 | 6 |
| beer keg | 8 | 3 |
| beer | 8 | 3 |
| keg | 291 | 18 |
| series | 13 | 1 |

910 — Stemmed Words and Phrases
912 — # Claims
914 — # Patents
915 — Show Result Document Done

```
Netscape - [MAPIT]                                              _ □ ×
File Edit View Go Bookmarks Options Directory Window Help
[Back] [Forward] [Home] [Reload] [Image] [Open] [Print] [Find] [Stop]
```

| | Analytics: 18 patents on beertaps | | | | |
|---|---|---|---|---|---|
| MAPIT info | Queries | Concept Query | Patent Query | Claim Query | Range Query |
| | Visualizations | | | | |

Datasets

Concept Query Results (all claims)  ─ 930

A tapper assembly for beer kegs, comprising in combination an adapter for mounting in an opening in a keg and including a housing containing magnetic material Analytics Click on a "Rank" number to view a side-by-side comparison of the claim and the original query.  Modify Query
Click on a "Patent" number to view the full text of the patent.           928   927

Canvas

| Rank | Patent | ─926 ☆ Title and Assignee | Relevance |
|---|---|---|---|
| 1 | 3,758,008 | TAPPING ASSEMBLY FOR BEER KEGS AND THE LIKE (None) | ★★★★★ |
| 2 | 3,908,861 | Series tapper assembly and method (None) | ★★★★ |
| 3 | 3,836,053 | LIQUID DISPENSING APPARATUS (None) | ★★★★ |
| 4 | 3,753,445 | WASHING, FILLING AND TAPPING VALVE ASSEMBLY (None) | ★★★ |
| 5 | 3,866,626 | FILLING AND TAPPING ASSEMBLY FOR BEER KEGS AND THE LIKE (None) | ★★★ |
| 6 | 3,913,608 | Keg adapter valve (None) | ★★★ |

Prefs
Help
Feedback
932

Document Done

FIG. 9D

The MAPIT
Main Window

Textual Analysis with the Viewer

Figure 3.2:
The MAPIT Viewer window showing text highlighted in two colors.

⬈ 1030

```
Netscape - [MAPIT]                                              _ □ ×
File  Edit  View  Go  Bookmarks  Options  Directory  Window  Help
[Back] [Forward] [Home] [Reload] [Image] [Open] [Print] [Find] [Stop]
```

| MAPIT info | Analytics: 18 patents on beertaps |
|---|---|
| 📄 Datasets | Queries / Visualizations    Concept Query    Patent Query    Claim Query    Range Query |

⌐ 1032                ⌐ 1034

| 3,880,182: Universal valve system for beer kegs and the like (None) | 3,886,626: FILLING AND TAPPING ASSEMBLY FOR BEER KEGS AND THE LIKE (None) |
|---|---|

Click on a "Rank" number to view a side-by-side comparison of the two claims.
Click on a "Patent" number to view the full text of the patent.
Click on "Claim" number to view the full text of the claim.

| Rank | Patent 3,880,182 ⌐1036 | Patent 3,866,626 ⌐1036 | Phrases | Theme |
|---|---|---|---|---|
| 1. | Claim 20: A valve system according to claim 1, further including: a liquid filling pipe having an upper end to be received in the keg opening in sealing ... | Claim 2: A valve system according to claim 1, which further includes means for moving the valve body from the open position to the closed position | 83 | 68 |
| | ⌐1036 | ⌐1036 | | |
| 2. | Claim 21: A valve system according to claim 20, in which the filling head contains means for opening the liquid valve means in the valve assembly ... | Claim 2: A valve assembly according to claim 1, which further includes means for moving the valve body from the open position to the | 82 | 62 |

1038

Document done.

MANAGEMENT AND ANALYSIS OF DOCUMENT INFORMATION TEXT

This application claims the benefit of U.S. Provisional Application No. 60/028,437, filed Oct. 15, 1996, the full disclosure of which is incorporated by reference.

CROSS-REFERENCE TO RELATED APPLICATIONS

This application claims priority from the following U.S. Provisional Application, the disclosure of which, including all appendices and all attached documents, is incorporated by reference in its entirety for all purposes:

U.S. Provisional Patent Application, serial no. 60/028, 437, David L. Snyder and Randall J. Calistri-Yeh, entitled, "Management and Analysis of Patent Information Text (MAPIT)", filed Oct. 15, 1996.

Further, this application incorporates by reference the following U.S. patent applications in their entirety for all purposes:

U.S. patent application Ser. No. 08/696,702, pending Elizabeth D. Liddy, et. al. entitled, "User Interface and Other Enhancements for Natural Language Information Retrieval System and Method", filed Aug. 14, 1996; and U.S. Provisional Patent Application, serial no. 60/042, 295, Michael L. Weiner and John J. Kolb V., entitled, "Method and Apparatus for Automatic Extraction and Graphic Visualization of Textual Information", filed Apr. 1, 1997.

CROSS-REFERENCE TO ARTICLES

Further, this application incorporates by reference the following articles in their entirety for all purposes:

Liddy, E. D., Paik, W., Yu, E. S. & McVearry, K., "An overview of DR-LINK and its approach to document filtering," *Proceedings of the ARPA Workshop on Human Language Technology* (1993);

Liddy, E. D. & Myaeng, S. H. (1994). DR-LINK System: Phase I Summary. *Proceedings of the TIPSTER Phase I Final Report.*

Liddy, E. D., Paik, W., Yu, E. S. & McKenna, M. (1994). Document retrieval using linguistic knowledge. *Proceedings of RIAO '94 Conference.*

Liddy, E. D., Paik, W., Yu, E. S. Text categorization for multiple users based on semantic information from an MRD. *ACM Transactions on Information Systems.* Publication date: 1994. Presentation date: July, 1994.

Liddy, E. D., Paik, W., McKenna, M. & Yu, E. S. (1995) A natural language text retrieval system with relevance feedback. *Proceedings of the 16th National Online Meeting.*

Paik, W., Liddy, E. D., Yu, E. S. & McKenna, M. Categorizing and standardizing proper nouns for efficient information retrieval. *Proceedings of the ACL Workshop on Acquisition of Lexical Knowledge from Text.* Publication date: 1993.

Paik, W., Liddy, E. D., Yu, E. S. & McKenna, M. Interpretation of Proper Nouns for Information Retrieval. *Proceedings of the ARPA Workshop on Human Language Technology.* Publication date: 1993.

Salton, G. and Buckley, C. Term-weighting Approaches in Automatic Text Retrieval. *Information Processing and Management.* Volume 24, 513–523. Publication date: 1988 ("Salton reference").

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

BACKGROUND OF THE INVENTION

The present invention relates to information management and, more particularly to the management and analysis of document information text.

We live in the information age. How prophetic the statement of a major computer manufacturer which said "It was supposed to be the atomic age, instead it has turned out to be the information age." Prophetic both in the impact of the age, as well as its potential for beneficial and deleterious effects on humankind. Faced with an explosion of information fueled by the burgeoning technologies of networking, inter-networking, computing and the trends of globalization and decentralization of power, today's business manager, technical professional and investment manager are faced with the need for careful, accurate and timely analysis of the deluge of information underlying their everyday decisions. Several factors underlie this need for prompt information analysis. First, in an era of ever tighter cost controls and budgetary constraints, companies are faced with a need to increase their operational efficiency. In doing so, they face the need to assimilate large amounts of accounting and financial information, both concerning their internal functioning as well as their position in the market place. Second, the omnipresent factor of litigation which may cost or earn a company billions of dollars. The outcome of such contests is often determined by which side has access to the most accurate information. Third, the drive for greater economies of scale and cost efficiencies spurs mergers and acquisitions, especially in high technology areas. The success of such activity is highly dependent upon who has superior abilities to assimilate information. Fourth, the explosive growth of technology in all areas, especially in biotechnology, computing and finance, brings with it the need to access and comprehend technical trends impacting the individual firm. Fifth, the globalization of the market place in which today's business entities find themselves brings with it the need to master information concerning a multiplicity of market mechanisms in a multiplicity of native languages and legal systems. Sixth, the decentralization of large industrial giants has led to the need for greater cross-licensing of indigenous technologies; requiring that companies discern precisely the quantity and kinds of technology being cross-licensed.

Faced with the increasing importance of successful analysis of a burgeoning information stockpile, today's business professional is faced, as never before, with a need for tools which not only find information, but find the correct information, as well as, assist the user in drawing conclusions and perceiving the meaning behind the information resources discovered.

The most typical information analysis tool available today is a database of text or images which is searched by a rudimentary search engine. The user enters a search query consisting of specific key words encoded in a boolean formalism. Often the notation is so complex that trained librarians are needed to ensure that the formula is correct. The results of database searches are a list of documents containing the key words the user has requested. The user often does not know the closeness of the match until each reference cited by the search engine is studied manually. There is often no way to search different portions of documents. Finally, the output of this process is a flat amalgam of documents which has not been analyzed or understood by the system performing the search.

The user who turns to an automated information analysis system is seeking not merely a collection of related documents, but the answers to critical questions. For example, "Are there any issued patents that are so close to this invention proposal that they might represent a potential infringement problem?"

"Are the resources of company X complimentary to our own company such that we should consider a merger with company X?"

"Of the court cases decided in California last year, how many of them involved a sexual harassment charge?"

"What companies exist as potential competitors in the market place for our planned product?"

Current analysis tools demonstrate themselves to be ineffective when faced with these types of issues. What is needed is an information analysis tool capable of analyzing, acquiring, comprehending a large amount of information and presenting that information to users in a intelligible way.

SUMMARY OF THE INVENTION

The present invention provides an interactive document-management-and-analysis system and method for analyzing and displaying information contained in a plurality of documents. Particular embodiments of the invention are especially effective for analyzing patent texts, such as patent claims, abstracts, and other portions of the specification.

A method according to one embodiment of the invention includes generating a set of N different representations of each document, and for each of a number of selected pairs of documents, determining N utility measures, a given utility measure being based on one of the N representations of the documents in that pair. In a specific embodiment, this information is displayed as a scatter plot in an area bounded by N non-parallel axes, where each selected pair is represented by a point in N-space having its coordinates along the N axes equal to the N utility measures.

In a specific embodiment, wherein N=2, the first representation is a conceptual-level representation such as a subject vector, and the second representation is a term-based representation such as a word vector.

In one use scenario, the selected pairs include all pair wise combinations of the documents in the plurality. In another scenario, the selected pairs are all pair wise combinations that include a particular document in the plurality.

The use of multiple methods of analysis, such as, for example, word-vector analysis and semantic-thread analysis, creates synergistic benefits by providing multiple independent measures of similarity. A system which uses multiple methods together can discover similar documents that either single method may have overlooked. In the cases where both methods agree, the user has greater confidence in the results because of the built-in "second opinion".

In accordance with another aspect of the invention, a dynamic concept query is performed by treating a user-specified query as a special type of document. The user can enter a list of words ranging from a single keyword to the text of an entire document, which is treated as a new document. A multidimensional array of similarity scores comparing that document to each existing document in the set is calculated. The user can then view the resulting clusters using the visualization techniques described herein.

The invention provides for an innovative analysis tool that assists users in discovering relationships among thousands of documents such as patents. Sophisticated natural language and information retrieval techniques enable the user to analyze claim sets, cluster claims based on similarity, and navigate through the results using graphical and textual visualization.

The invention provides further for a search routine which goes beyond simple keyword search; it understands the structure of documents such as patents and it captures concepts like patent infringement and interference. Users can browse through data visualizations (e.g., range query as described below), inspect quantitative score comparisons, and perform side-by-side textual analysis of matching patent claims. Based on the information gathered, users may analyze competitive patent and acquisition portfolios, develop patent blocking strategies, and find potential patent infringement.

In accordance with another aspect of the invention, the analysis methods described herein may be applied to a set of documents formed by the additional step of filtering a larger set of documents based on a concept query. For example, a user may find it useful to examine only those patents that discuss microelectronic packaging, analyze those patents, and generate a scatter plot display (e.g., run a concept query to pick a claim of interest followed by a claim query based on such claim and generate an overlay plot as described below).

In accordance with another aspect of the invention, recognizing and exploiting the relationship between various document types and "compound documents" each to the other permits multi-faceted analyses of multiple document types. For example, a patent is a compound document with nested sub-document linkages to sub-components, such as claims, background and summary of invention, etc. A claim is also a compound document because it may refer to other claims. Applying this paradigm to document analysis strategies, claims, whether individual, nested or as an amalgam, may be compared to other compound document components. For example, comparing claims to background and summary of invention in a patent. Furthermore, claims and background and summary of invention can be compared to other documents, such as related prior art literature from other sources such as magazines or journals. This enables the patent practitioner to view relevant claims, background and summaries, and other documents (non-patents), and cluster these together by similarity measures.

In accordance with one aspect of the invention, the user may select a metric that captures the essence of the document or documents under analysis. For example, the legal concept of patent infringement may be applied to sets of patents or patent applications. In a particular embodiment, a similarity matching algorithm treats the exemplar part of a patent claim differently from the dependent parts of the claim. Thus, a kind of "cross-comparison" matching is used, wherein the combined scores for (1) patent A, claim X dependent and independent part(s) vs. patent B, claim Y, independent part and (2) patent A, claim X dependent and independent part(s) vs. patent B, claim Y, dependent and independent part(s), generate an aggregate matching (or similarity) score for patent A, claim X vs. patent B, claim Y.

Normalization techniques deal with asymmetries in the matching, especially for documents of different lengths. For example, in the patent context, the situation where there is a short claim on "blue paint" and a long claim containing "blue paint." Looking at the small claim vs. the long claim appears close (since the long one at least contains the small one). But what of the case where it's the long claim vs. the small one? Standard information retrieval techniques would dictate that it's a poor match, since the long claim contains many limitations not in the small one. For patents, the "interference/infringement" match suggests that these are close, because if one "covers" the other, it doesn't matter which is the "query" and which is the "document."

Similarity based on the legal concept of patent infringement and interference serves as the touchstone to analyze, cluster and visualize patents and applications. This enables users to evaluate incoming applications for infringement against existing patents, filter large sets of patents to remove reissued and derivative patents, identify significant claim modifications in a reissued patent and identify related and unrelated patents to compare the intellectual property of two businesses.

A further understanding of the nature and advantages of the present invention may be realized by reference to the remaining portions of the specification and the drawings.

BRIEF DESCRIPTION OF THE DRAWINGS

FIG. 9C illustrates a representative concept query review screen according to a particular embodiment of the invention;

FIG. 9D illustrates a representative concept query results screen according to a particular embodiment of the invention;

FIG. 10C illustrates a representative patent query side-by-side comparison screen of claims according to a particular embodiment of the invention;

FIG. 11B illustrates a representative claim query claim finding screen according to a particular embodiment of the invention;

FIG. 11C illustrates a representative claim query results screen according to a particular embodiment of the invention;

FIG. 12B illustrates a representative range query results screen according to a particular embodiment of the invention.

DESCRIPTION OF SPECIFIC EMBODIMENTS

Figure 1A:
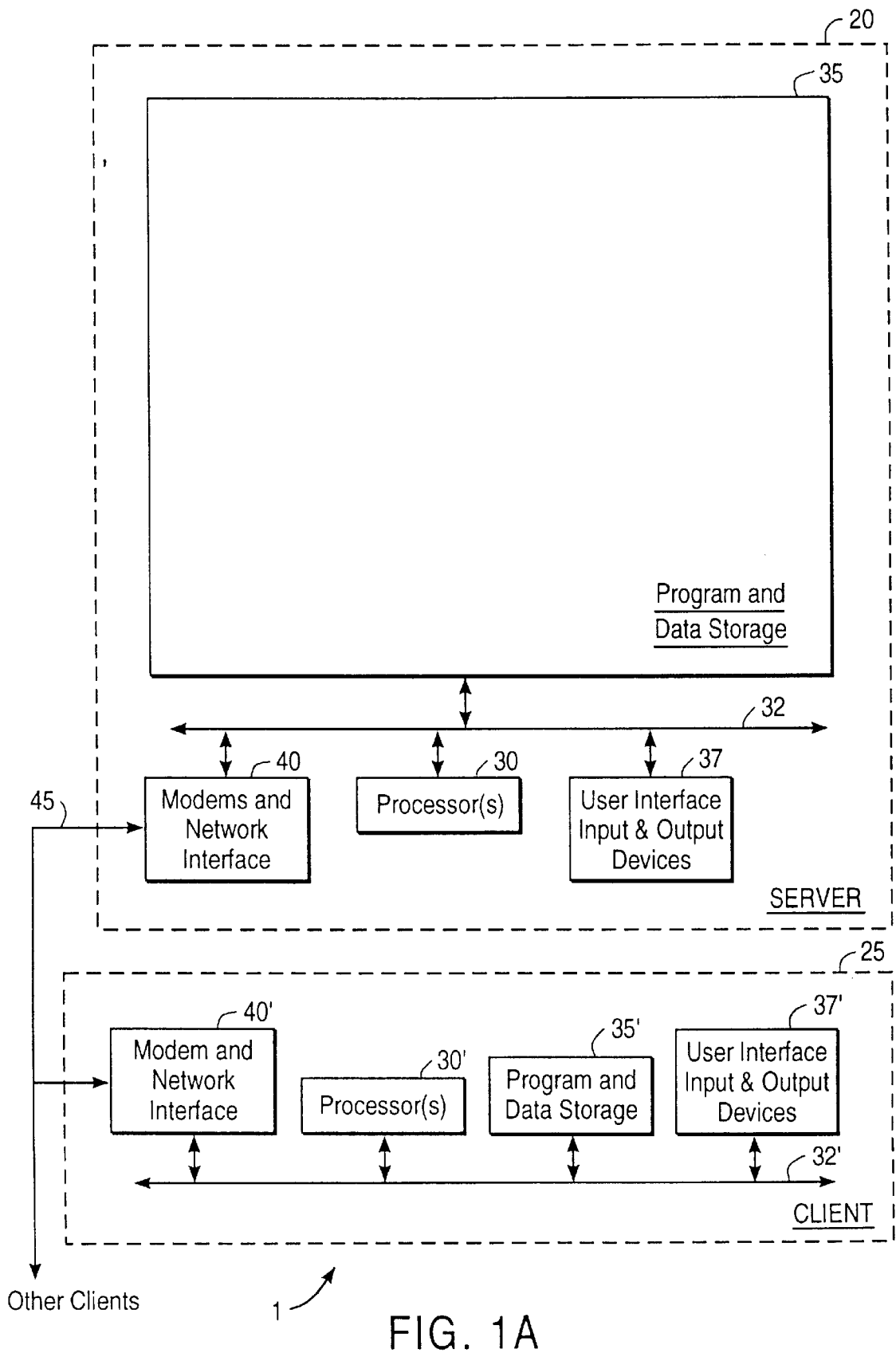
FIG. 1A is a block diagram of a document analysis system embodying the present invention.

A preferable embodiment of a document-management-and-analysis system and method according to the invention applicable to the task of patent search and analysis is reduced to practice and is available under the trade name, MAPIT™.

A document search and analysis tool must be both fast enough to handle a voluminous quantity of documents and flexible enough to adapt to different user requirements. Other aspects of the invention are of particular importance to expedient, accurate and efficient document analysis. First, the understanding of the structure and content of documents on multiple levels is useful to provide a much deeper analysis than generic search engines known in the art. Second, the combination of multiple similarity metrics is useful to achieve highly customized results. By contrast, search engines known in the art restrict the user to whatever notion of similarity was incorporated into the system by its designers. Third, the ability to parse structured documents, such as patent claims, is useful to extract their meaning. Fourth, the graphical display of information relevant to the user provides the user with quick access to the product of the analysis.

In accordance with the invention, multiple forms of textual analysis used to compare documents may be combined in any particular embodiment. One textual analysis method, called word-vector (also referred to as "wordvec" and "term-based") analysis, focuses on the co-occurrences of individual words and phrases between documents under analysis. Stemming technology, used in conjunction with word-vector analysis, matches words such as "projected" and "projection". Noun phrases, which are the key building blocks for many documents, such as patents, are identified and isolated. Those technologies are not restricted to English, but can be applied directly to other European languages. Word-vector analysis may be reduced to practice using Term Frequency/Inverse Document Frequency ("TF.IDF") techniques, or other techniques known in the art. TF.IDF techniques are further described in the Salton reference identfied above.

Another form of textual analysis is called semantic thread analysis (also referred to herein as "subject-vector" or "conceptual representation" analysis). Instead of focusing on individual words, this method identifies the general topics and themes in a document. It can determine that a patent, for example, is 35% about engineering physics, 15% about polymer science, 20% about holography, and 30% about manufacturing processes. If two patents cover the same subject areas in the same proportions, it is likely that they are closely related even if they use completely different words to describe their inventions. Semantic thread analysis may be reduced to practice by employing subject field code (SFC) techniques described by Dr. Elizabeth Liddy, et al. in one or more of the references identified above.

Preface on the Format of the Drawings

Embodiments of the invention will be best understood with reference to the drawings included herewith. A note on the format of these drawings is in order. In the drawings, process steps are depicted as squares or rectangles. Data structures internal to the program are depicted as rhomboid type structures. For example, in reference to FIG. 2A, element 10, text format file of patents in a search set is a rhomboid structure. Conventional data or text files are depicted as squares or rectangles with the upper right hand corner turned downward. For example, in FIG. 2A element 50 justclaims is a file which may exist on a hard disk, floppy disk, CD ROM or other form of storage medium. Open ended arrows reflect the flow of information. Tailess arrows indicate the flow of processing.

These drawings depict the processing steps, files and information according to one embodiment of the invention targeted to processing and understanding patents. While this serves as an excellent example of the features of the invention, the reader with ordinary skill in the art will appreciate that the invention's scope encompasses not merely the understanding and analysis of patents, but other documents as well.

Table 1 provides a definitional list of terminology used herein.

TABLE 1

| Term | Definition |
| --- | --- |
| Claim Query | A query against a collection of text documents compared to a part of a particular member of the collection. |
| Concept Query | A query against a collection of text documents compared to a user input textual concept. |
| Corpus | A dataset. |
| Dataset | A document database containing documents upon which search and analysis operations are conducted. |
| Document | A unit of text which is selected for analysis which may incude an entire document or any portion thereof such as a title, an abstract, or one or more clauses, sentences, or paragraphs. A document will typically be a member of a document database containing a large number of documents and may be referred to by the term corpus. |
| DR LINK | Document Retrieval using Linguistic Knowledge. This is a system for performing natural language processing. This system is described in papers by Dr. Liddy referenced in the cross-reference section herein above. |
| Patent Query | A query against a collection of text documents compared to a particular member of the collection, identified by the user. |
| Polysemy | The ability of a word to have multipie meanings. |
| Query | Text that is input for the purpose of selecting a subset of documents from a document database. While most queries entered by a user tend to be short compared to most documents stored in a database this should not be assumed. |
| score | A numerical indicator assigned to a document indicative of a particular characteristic, e.g. relevance to a query. |
| Searchset | A document database containing documents upon which search and analysis operations are conducted. |
| SFC | Subject field coder. A subject field coder is a process which tags content-bearing words in a text with a disambiguated subject code using a lexical resource of words which are grouped in subject categories. |
| SGML | Standard Generalized Markup Language. Standard generalized markup language is comprised of a set of tags which may be embedded into a text document to indicate to a text processor how to process the surrounding or encompassed text. |
| Split Dataset | A dataset may be split into two distinct components in order to perform comparative analyses between the two sub-datasets. For example, a split datasetof A company patents and B company patents enables the user to discover relationships between the patent portfolios of the two companies. |
| Stemming | Stemming is a process whereby nouns are reduced to their most basic form or stem. For example, the words "processing" and "processed" are stemmed to the word "process". |
| Stop Word | One of a collection of words which are not assigned a semantic meaning by the system. For example, the word "the". |
| Stop Word List | A list of stop words. |
| Term Index | A unique identifier assigned to each stem by a term indexer. |
| Term Indexer | Term indexer is a process which performs indexing on an input text. Indexing involves extracting terms from the text, checking for stop words, processing hyphenated words, then stemming all inflected terms to a standard form. Finally, a unique term index is assigned to each stem. |
| TFIDF | Term Frequency/Inverse Document Frequency. This is a score computed by a term indexer process. This score determines the relative prominence of a term compared to its occurrence throughout a document body. |
| Token | A white space delimited sequence of characters having a particuiar meaning. |

TABLE 1-continued

| Term | Definition |
|---|---|
| Tokenize | A process whereby input text is separated into a collection of tokens. |
| Transitive Closure | The transitive closure of a claim is the claim itself and the transitive closure of all references within the particular claim. |
| weight | A numerical indicator assigned to a word or token indicative of a particular characteristic, e.g. relevance to a query. |
| Word | A sinqle word, compound word, phrase or multiword construct. Note that the terms "word" and "term" are used interchangeably. Terms and words include, for example, nouns, proper nouns, complex nominals, noun phrases, verbs, and verbs numeric expressions and adjectives. These include stemmed and non-stemmed forms. |

Hardware Overview

The document-management-and-analysis system (the "system") of the present invention is implemented in the "C", "C++", "perl" and UNIX shell script programming languages and is operational on a computer system such as shown in FIG. 1A. This figure shows a conventional client-server computer system 1 that includes a server 20 and numerous clients, one of which is shown at 25. The use of the term "server" is used in the context of the invention, where the server receives queries from (typically remote) clients, does substantially all the processing necessary to formulate responses to the queries, and provides these responses to the clients. However, server 20 may itself act in the capacity of a client when it accesses remote databases located on a database server. Furthermore, while a client-server configuration is known, the invention may be implemented as a standalone facility, in which case client 25 would be absent from the figure.

The hardware configurations are in general standard, and will be described only briefly. In accordance with known practice, server 20 includes one or more processors 30 that communicate with a number of peripheral devices via a bus subsystem 32. These peripheral devices typically include a storage subsystem 35 (memory subsystem and file storage subsystem holding computer program (e.g., code or instructions) and data implementing the document-management-and-analysis system), a set of user interface input and output devices 37, and an interface to outside networks, including the public switched telephone network. This interface is shown schematically as a "Modems and Network Interface" block 40, and is coupled to corresponding interface devices in client computers via a network connection 45.

Client 25 has the same general configuration, although typically with less storage and processing capability. Thus, while the client computer could be a terminal or a low-end personal computer, the server computer would generally need to be a high-end workstation or mainframe, such as a SUN sparc server. Corresponding elements and subsystems in the client computer are shown with corresponding, but primed, reference numerals.

The user interface input devices typically includes a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

The user interface output devices typically include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the computer system may include drives of the type with removable media cartridges. The removable media cartridges may, for example be hard disk cartridges, such as those marketed by Syquest and others, and flexible disk cartridges, such as those marketed by Iomega. One or more of the drive may be located at a remote location, such as in a server on a local area network or at a site of the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to modem or network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
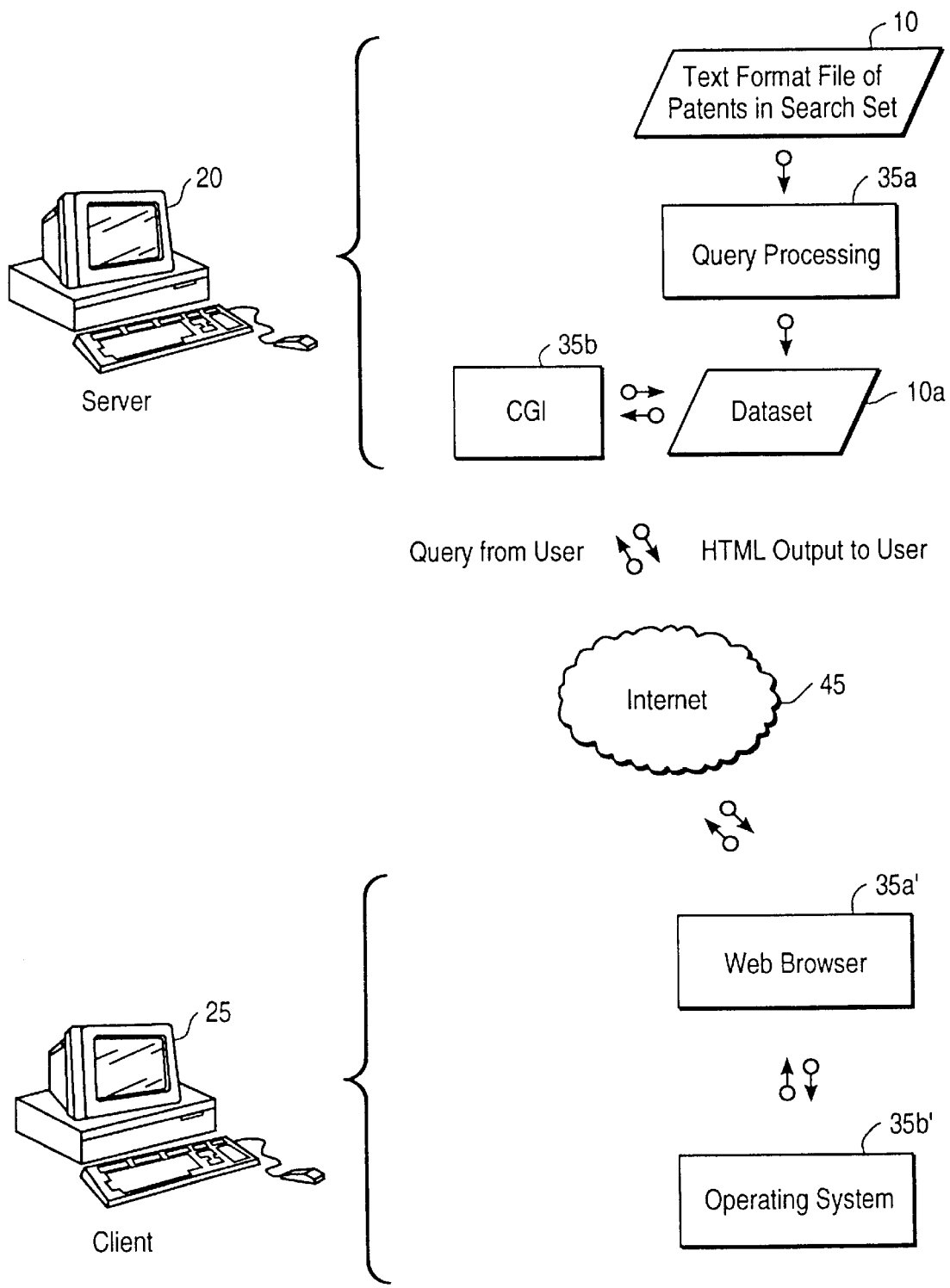
FIG. 1B is a more detailed block diagram of the interactions between the user and the system during the processing of document information.

FIG. 1B is a functional diagram of computer system 1. FIG. 1B depicts a server 20 preferably running Sun Solaris software or its equivalent, and a representative client 25 of a multiplicity of clients which may interact with the server 20 via the internet 45 or any other communications method. Blocks to the right of the server are indicative of the processing steps and functions which occur in the server's program and data storage indicated by block 35 in FIG. 1A. Input search set 10 which in this embodiment is a text format file of patents to be searched serves as the input to query processing block 35A. Query processing manipulates the input data 10 to yield a searchable dataset 10A. A Common Gateway Interface (CGI) script 35B enables queries from user clients to operate upon the dataset 10A and responses to those queries from the information in the dataset 10A back to the clients in the form of a Hypertext Markup Language (HTML) document outputs which are then communicated via internet 45 back to the user.

Client 25 in FIG. 1B possesses software implementing the function of a web browser 35A' and an operating system 35B'. The user of the client may interact via the web browser 35A' with the system to make queries of the server 20 via internet 45 and to view responses from the server 20 via internet 45 on the web browser 35A'.

In accordance with one aspect of the invention, documents may be thought of as belonging to two broad categories. The first are structured documents; those having a very highly specific structure. For example the claims incorporated within patents are structured. To accurately compare claims from two different patents, it is necessary to realize that a claim may refer to earlier claims, and those earlier claims must enter into the analysis. Furthermore, for purposes of infringement analysis, it is important to treat the "head" of a chain of dependent claims differently from the rest of the body. The second type of document is a more generic form of document having no definable structural components referred to as generic documents.

In a particular embodiment, the invention divides overall processing into an off-line processing step and an on-line query step. The off-line processing step will process incoming document information from a variety of input sources, such as a database of U.S. patents, a collection of documents scanned into electronic format by a scanner or a database of newsprint, and build from it structures which allow the system to be able to manipulate and interpret the data acquired from these input sources. The query steps on the other hand, are targeted to on-line interactions with the system to gain from it knowledge about information which the off-line step has processed.

Off-Line Processing

Figure 2A:
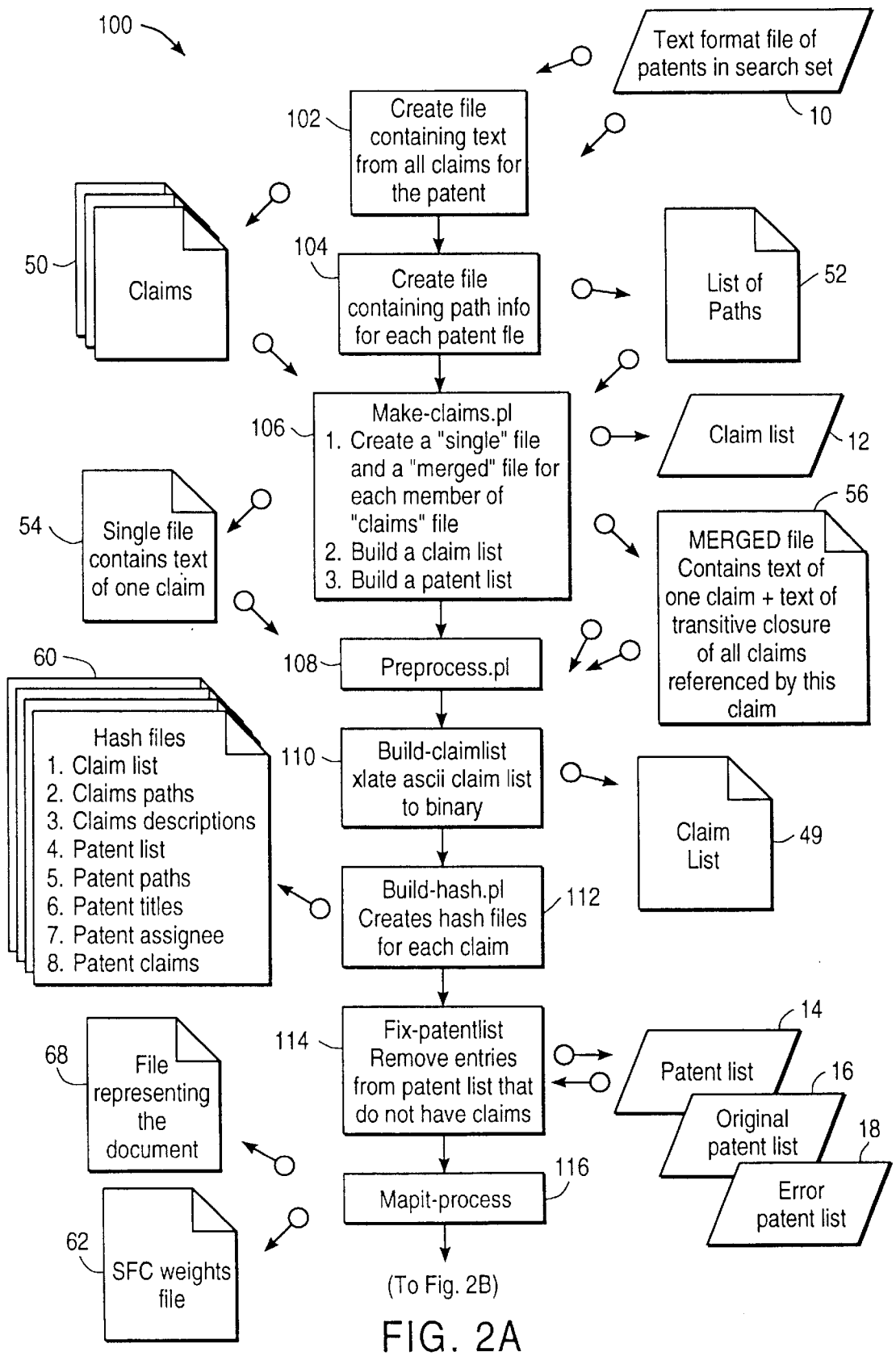
FIGS. 2A–2B depict off line structured document processing steps according to a particular embodiment.

FIG. 2A depicts off-line processing of structured documents (or claims in this example) in this particular embodiment of the invention. A text format file of patents search set 10 comprises the input data to the system. Input data may be in multiple formats. One particular format is described in Table 3 which follows:

TABLE 2

TTPPPPPPP_CCC

1. TT is a 2-digit number used to identify the following patent-related documents:
    (1) normal patent
    (2) RE(reissue)
    (3) PP (plant patent)
    (4) D (design patent)
    (5) T (defensive publication number)
    (6) H (statutory invention registration)
    (7) HD (design statutory invention registration)
    (8) HP (plant statutory invention registration)
2. PPPPPPP is the original PTO patent number, possibly zero-padded on the left to force it to 7 digits.

TABLE 2-continued

TTPPPPPPP_CCC

3. CCC is a particular claim number, possibly zero-padded on the left to force it to 3 digits. In addition to identifying claims, this field is also used to identify a document type with select "dummy" numbers (e.g., in the "900" range) assigned particular meaning by the system:
    (1) full patent
    (2) abstract
    (3) summary
    (4) detailed description
    (5) drawings
    (6) justclaims There are two exceptions to this numbering convention:

1. the full text of the patent may be specified using the patent number with no claim at all (TTPPPPPPP)
2. the justclaims file may be specified using the patent number with a ".justclaims" extension (TTPPPPPPP.justclaims)

Claim processing for a data set begins with the step of creating a justclaims file 50 for each patent in the set, pursuant to step 102 of FIG. 2A. Each file 50 contains the text of all the claims of one patent disposed within the set. The reader of ordinary skill in the art will appreciate that the specific processing of this step necessarily conforms to the format of the source text available to the system. For example, if the source text is in text format, this step must process textual data. Next a justclaimslist 52 is produced in step 104. The justclaimslist contains the full directory path to each justclaims file 50 in the order that they are processed.

Pursuant to step 106, a make-claims routine is executed. This make-claims routine takes each of the justclaims files 50 created in step 102 and one line from justclaimslist 52 and creates two separate files for each claim contained in file 50 (and therefore in a patent). The first file, called single file 54, contains the text of one claim. The second file, called merged file 56, contains the text of one claim plus the text of the transitive closure of all claims referenced by that claim. The output from make-claims step 106 also includes a claimlist data structure 12 and a patentlist data structure 14 (in the form of conventional binary data file). The make-claims step employs numerous heuristics in an attempt to identify both the scope and references of the claims. For example: 1) Each claim must start on a new line and that line must start with the claim number, a period and one or more spaces; 2) Claims must be numbered sequentially starting with 1 (note that this heuristic will not catch the case where, for example, claim 4 has text including a line starting with "5."); 3) References to other claims are understood by the system, such as: a) "claim 3", b) "Claim 3", c) "claim 2 or 3", d) "claim 2 and 3", e) "claims 2 or 3", f) "claims 2 and 3", g) "claims 2, 3, or 4", h) "claims 2–4", i) "claims 2 to 4", j) "claims 2 through 4", k) "claims 2–5 inclusive or 8", l) "all previous claims", m) "any proceeding claims"; and 4) Claims can only refer to claims occurring previously in documents. It is possible but rare to legally refer to a future claim. It is rather common to have a typographic error refer to a future claim by mistake. If a reference to a future claim is encountered, a warning message is printed, the reference is skipped and processing continues. (This warning is forwarded to the user, who determines whether the reference to a future claim is intentional or a typographical error.) All claims referred to by the current claim, and all claims recursively referred to by any of them, are printed in the order encountered following the text of the current claim. The remaining heuristics are specified in Table 3 below.

Preprocess step 108 has a task of taking raw document input, filtering from it extraneous matter and extracting root words and noun phrases. A commercial-off-the-shelf (COTS) language processing tool such as the XLT software package available from Xerox, a corporation with headquarters in Stamford, Conn., performs much of the processing. Although other software such as part-of-speech (POS) tagger of the type provided by such companies as Inso Corporation, Boston, Mass. may also be used. Its behavior in this embodiment is depicted with greater particularity in FIG. 3.

Figure 3:
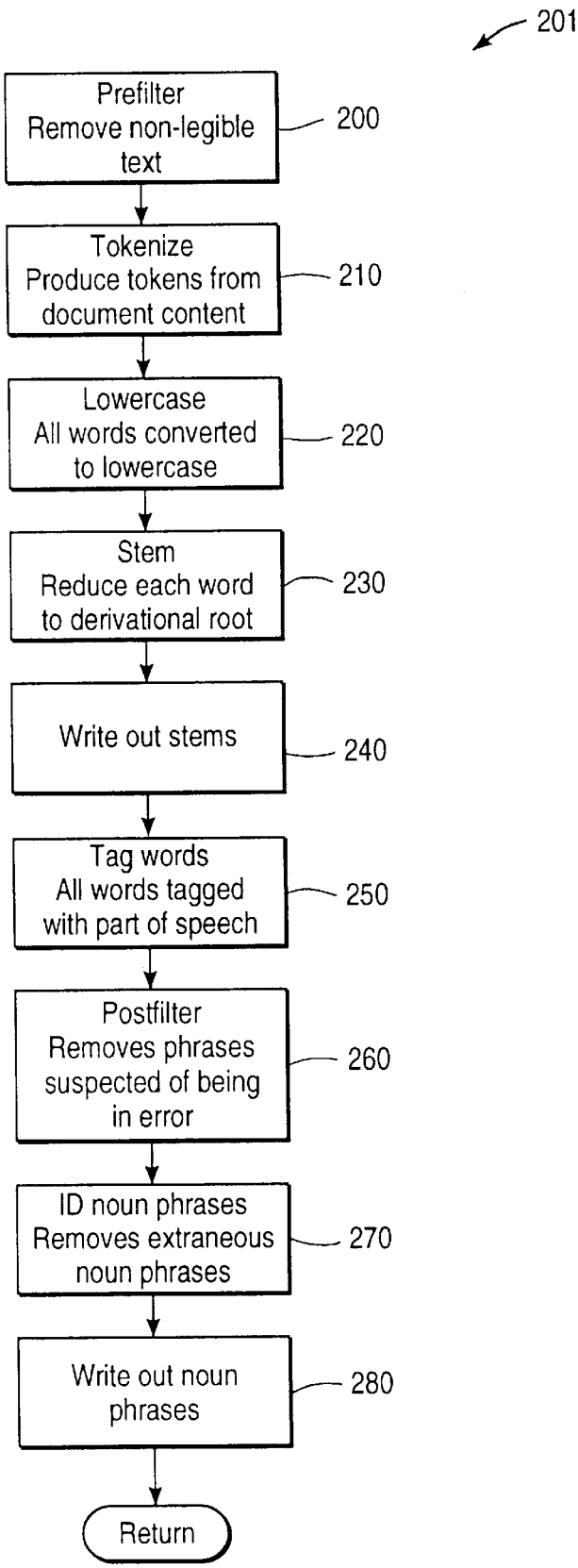
FIG. 3 depicts the preprocess step of off line structured document processing of FIGS. 2A–2B according to a particular embodiment.

Referring to flowchart 201 of FIG. 3, the preprocess step initially prefilters input text and removes nonlegible items, pursuant to step 200. The following heuristics are used: a) Any non-ASCII characters are converted to tilda (~); b) Any hyphens are converted to a space; c) Any words with more than 50 characters are dropped; d) Any words with less than one letter or more than five non-letters are dropped; and e) Any strings of more than four one or two letter words are dropped to the first two words.

Next, a tokenize step 210 tokenizes the document text. If the program detects that there are more than 100,000 tokens in a particular document, the program will end with an error message. Following step 210, all words are converted to lower case pursuant to step 220. Each word is then reduced to its derivational root in stem step 230. For example, the words "processed" and "processing" would be stemmed to the word "process". Stems are written out in step 240 with two exceptions: 1) If the stemmed word contains anything except letters, it is not printed and 2) If the original word is contained in the stop word list, it is not printed.

The next step is tag words step 250. All words are tagged with their part of speech working one sentence at a time. If the sentence has more than 1,000 tokens, the program will skip this sentence. Post filter step 260 removes phrases suspected of being in error. For example, known phrases with more than five nouns in a row are removed. I.D. noun phrases 270 removes extraneous noun-phrases. For example, if the phrase contains the word "said" the phrase is removed. If the phrase contains the word "claim" or "claims", the phrase is removed. Additional extraneous terms related specifically to the subject technology may also be identified and removed.

In step Write-out noun phrases 280, all noun phrases are written to the standard output on a single line separated by a space. The words in the phrase are joined by an underscore ("_"), according to the following heuristics: a) if the phrase contains the word "of", it is split into two phrases; b) if a word in the phrase falls into either of the two exceptions in step 240 identified above the word is skipped; c) if a noun phrase is longer than five words, the phrase is removed; and d) the phrase is printed along with all recombinations. In summary, preprocess step 108 produces a single file for each input document containing the foregoing subject matter ("preprocessing text file"), representing preprocessed documents for subsequent analysis.

Referring again to FIG. 2A, after preprocess step 108 completes, processing continues with a build-claimlist step 110. Build-claimlist translates the full directory paths of the justclaims files 50 represented in the justclaimslist file 52 as ASCII directory paths into a binary represented form of the directory path information stored in the claimlist.bin file 49. This enables later processing to work with binary represented full directory paths for these files, which is more efficient than working with the text represented files.

Following step 110, a build-DBM step 112 creates a series of DBM hash files 60 that enable the system to rapidly access information about various documents and claims. Each hash file consists of two separate UNIX files containing mapping information linking together information about the documents being processed. These hash files 60 are: 1) Claimlist, which maps from a claim number to a unique document index, representative of each document being analyzed; 2) Claimlist_path, which maps from a claim number to the full directory path to the text of that claim; 3) Claimlist_desc, which maps from a claim number to the first 150 characters of the claim; 4) Patentlist, which maps from a patent number to the unique document index; 5) Patentlist_path, which maps from a patent number to a full directory path to the text of that patent; 6) Patentlist_title, which maps from a patent number to the full title of the patent; 7) Patentlist_assignee, which maps from a patent number to the assignee of that patent; and 8) Patentlist_ claims, which maps from a patent number to a space separated list of claims included in that patent. Each hash file created in step 112 is a mapping between an ASCII key string and an ASCII value string.

In a preferable embodiment, approximately two million U.S. patents may be accommodated by the system by substituting a DB2 database in place of the DBM files, such substitution being a process well known to those having ordinary skill in the art. DB2 is a product of IBM Corporation, a corporation with headquarters in Armonk, N.Y.

Figure 4A:
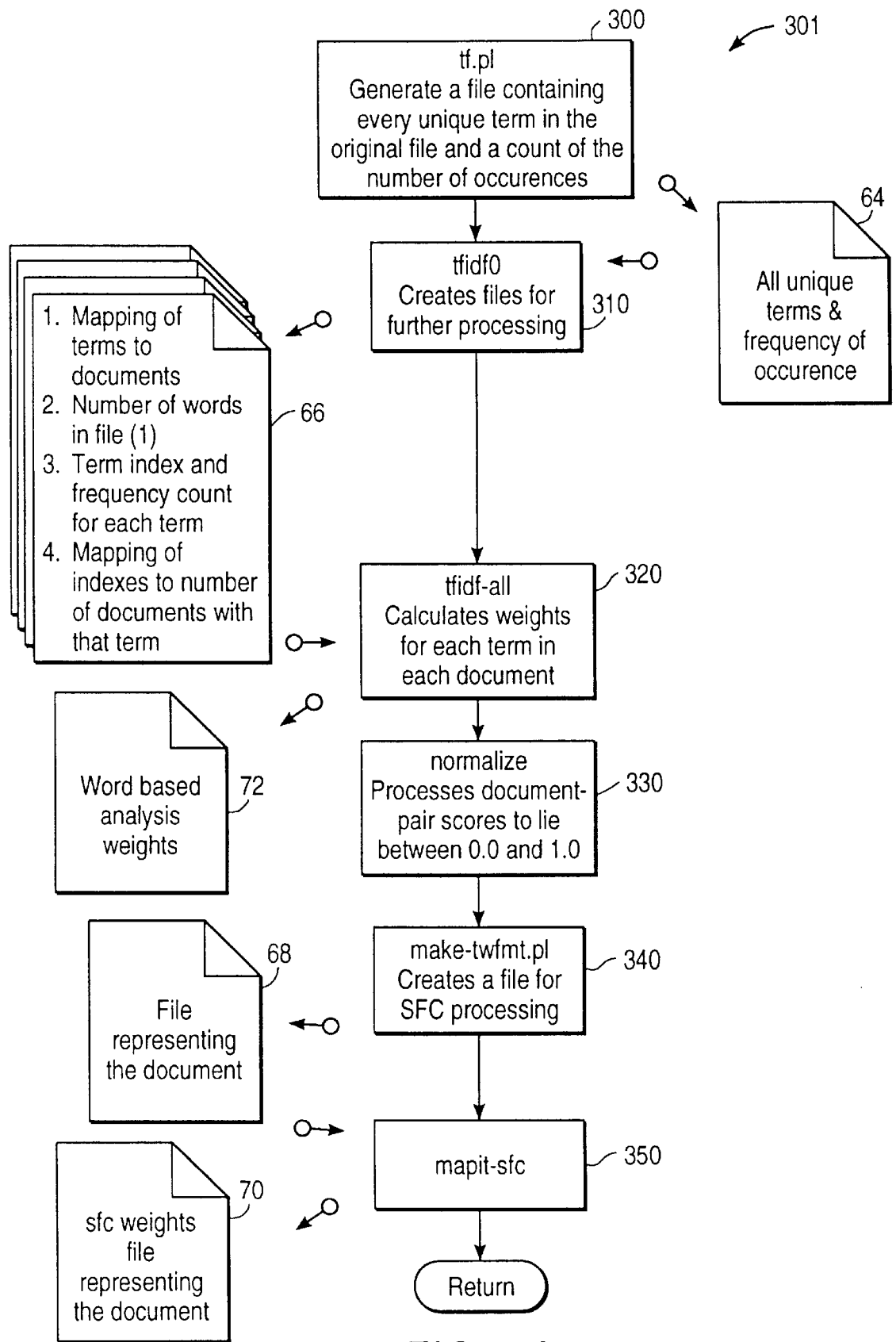
FIG. 4A depicts the mapit-process step of off line structured document processing of FIGS. 2A–2B according to a particular embodiment.

Following step 112, a fix-patentlist step 114 removes entries from patentlist data structure 14 that do not have any claims. The original patentlist is backed up to a patentlist-.fix.orig file 16. The remaining good patents (i.e., those with claims) stay in patentlist structure 14. Any bad patents are written to a patentlist.fix.bad data structure 18. Processing now continues with a mapit-process step 116 which is described in greater detail in flowchart 301 of FIG. 4A.

Referring to flowchart 301, initially tf step 300 translates a set of claimlist text files 12 which have been processed by the preprocess step 108 in FIG. 2A into a single mapit.wordvec.*.extr file 64. This file consists of a list of each unique term in the original claimlist files followed by a count of the number of occurrences of that term for each document. The mapit.wordvec.*.extr file is the last ASCII represented file that is produced during processing.

A tfidf0 step 310 next takes mapit.wordvec.*.extr file 64 produced by step 300 and creates four files 66 used in calculations in tfidf-all step 320. Included in files 66 are: 1) Mapit.wordvec.words file, which is a dbm hash file mapping each term in the body of documents being analyzed to a unique index; 2) Mapit.wordvec.words.count file, which is a binary file containing a single integer value for the number of words in the hash file; 3) Mapit.wordvec.histrex.tfidf0 file, which is a binary version of the file created by step 300 recording the term index and the frequency count for each term in each document; and 4) Mapit.wordvec.*.tfidf0.inv file, which maps an unique index associated with each term to the number of documents that contain that term. The total number of terms including duplicates in each document is printed to a standard-out (STDOUT) and is typically redirected a to mapit.wordvec.*.numwords file.

Referring again to FIG. 4A, a tfidf-all step 320 calculates actual TFIDF weights for each term in each document in the claimlist producing a mapit.wordvec.*.weights file 72. These weights are combined by mapit-all step 120 (FIG. 2B) or mapit-process-query step 420 (FIG. 5) to generate a "score" for a pair of documents. In a preferable embodiment two separate sets of weights are calculated for each document. The first set, query weights, is to be used when comparing the document against a concept query. The second set, doc weights, is used when comparing a document against another document. There are seven different TFIDF formulas available to calculate TFIDF weights. They are selected during configuration of the offline processing of the dataset (using, e.g., command-line options):

0. Basic Term Frequency log(word_count)+1.0   (0)

1. Term Frequency with extra log log(log(word_count)+ 1.0)+1.0   (1)

2. Basic Term Frequency/Inverse Document Frequency log(word_count)+1.0)*log((num_docs+1)/doc_count)   (2)

3. Term Frequency/Inverse Document Frequency with extra log (log(log(word_count)+1.0)+1.0)*log((num_docs+1)/doc_count)   (3)

4. Basic Term Frequency with extra average_TF term (log(word_count)+1.0)/(log(average-tf)+1.0)   (4)

5. Basic Inverse Document Frequency log(num_docs+1)/doc_count   (5)

6. Basic Term Frequency/Inverse Document Frequency with extra average_TF term (log(word_count)+1.0)/(log(average_tf)+1.0)*log((num_docs+1)/doc_count)   (6)

A preferable embodiment is configured to use formula (5) to compute query weights and formula (4) to compute doc weights. Each weight factor is divided by the following factor to adjust for document length:

$$(1.0-slope)*avg\_doc\_length+slope*current\_doc\_length \quad (7)$$

where slope=0.2.

A definition of each of the variables used in formulas (1)–(7) are provided below in Table 3.

TABLE 3

| VARIABLE | DEFINITION |
| --- | --- |
| word_count | Number of times word has appeared in a document |
| num_docs | Total number of documents processed |
| doc_count | Number of documents containing a word |
| average_tf | Average TF score across corpus |
| avg_doc_length | Average number of words per document |
| current_doc_length | Number of words in this document |

Following tfidf_all step 320, a normalize step 330 calculates a set of normalization factors that force all document-pair scores to lie between 0.0 and 1.0. By definition a document compared against itself as a perfect score of 1.0 and no other document can score higher than 1.0. In a preferable embodiment, a document is scored against itself by calculating the term weights with formula (4) hereinabove and then taking the dot product to arrive at a normalization factor. A score for this document against any other document is divided by this normalization factor, yielding a maximum score of 1.0.

After step 330, a make-twfmt step 340 creates a mapit.sfc.*.TWFMT file 68 for processing by a Subject Field Coder ("SFC"). Processing in step 340 concatenates all claim files together (e.g., single file 54 or merged file 56, etc.) and adds several Standard Generalized Mark-up Language ("SGML") tags as shown in Table 4. (Such processing is described in greater detail by Dr. Liddy, et al. in the articles identified above).

TABLE 4

>DOC<
>DOCNO< xxx >/DOCNO<
>DOCID< yyy >/DOCID<
>PARA< 1 >/PARA<
>TEXT<
text goes here
>/TEXT< xxx = the unique document number generated in make-dbm.pl (first document is #0)
yyy = the MAPIT claim number TTPPPPPPP_CCC Note that since documents are represented by SFCs, which are language independent, a related embodiment can perform multi-language word vector analysis on sets of documents. Thus, a related embodiment could, for example, analyze a set of French patents.

Figure 4B:
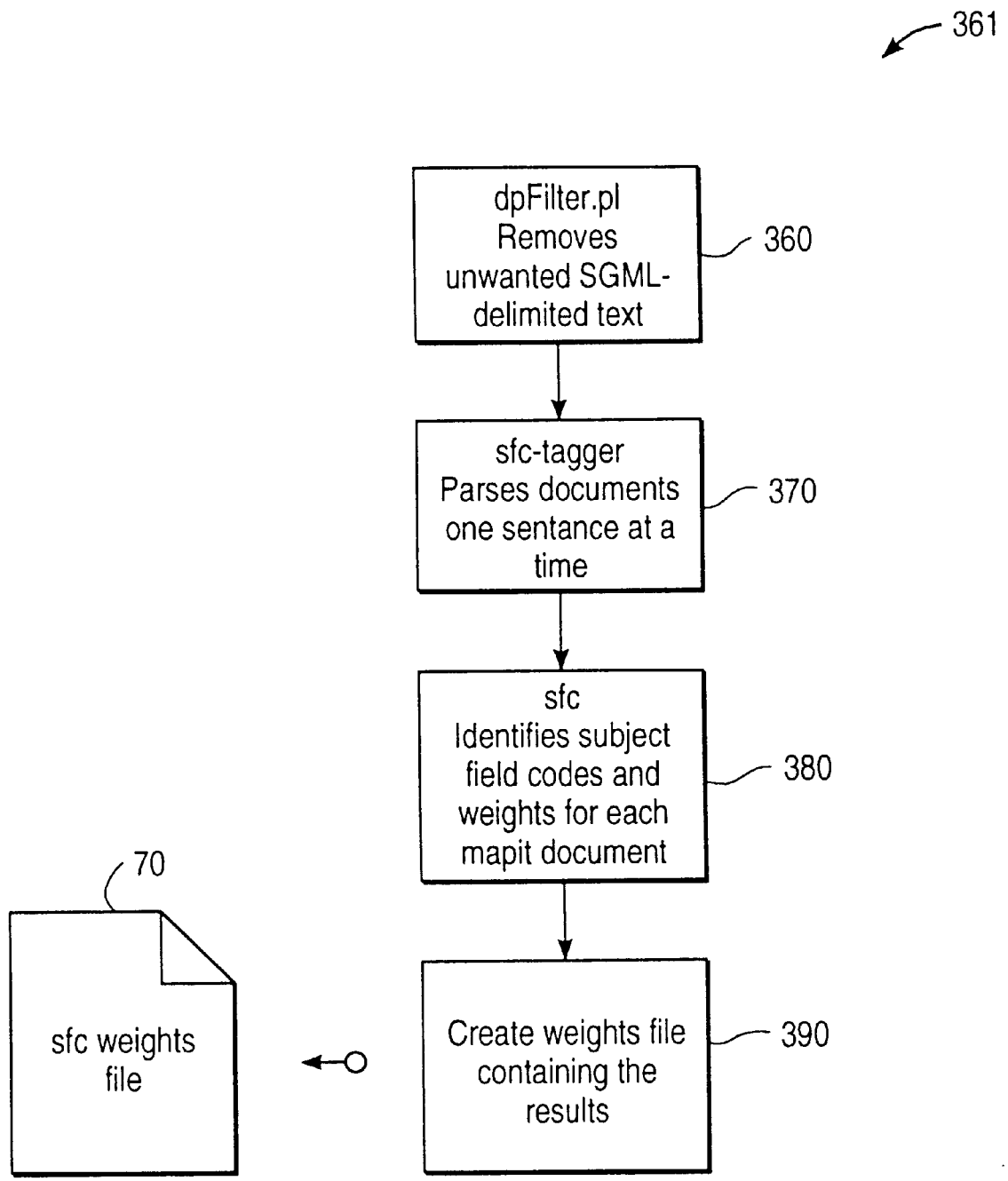
FIG. 4B depicts the mapit-sfc step of FIG. 4A according to a particular embodiment.

Mapit-sfc step 350 next performs subject field coding on mapit.sfc.*.twfmt file 68 produced in step 340. Processing mapit-sfc step 350 is detailed in flowchart 361 of FIG. 4B. Referring to FIG. 4B, the first step of such processing is dpfilter step 360 which removes unwanted SGML delimited text. Following step 360, sfc-tagger step 370 uses a part of speech tagger to parse all documents one sentence at a time. Sfc step 380 identifies subject field codes and the weighting for each document. Finally, step 390 creates a mapit.sfc-.weights file 70 for all documents containing the associated subject field codes and weights. Processing will now continue with step 120 of flowchart 100 as depicted on FIG. 2B.

Mapit-all step 120 produces a scores file from a weights file, creating mapit.*.scoresfile 74. This file has one integer weight from 0 to 99 for every pair of documents in the input document dataset. For example, given documents D1 and D2, corresponding with weight vectors w1 and w2 held in a weights file (such as mapit.*.wordvec.weights 72, for word vector weights, or mapit.*.sfc.weights 70, for SFC weights), corresponding normalization constants n1 and n2 held in file mapit.*.norm (created in step 330, and combination function f(w1,w2) defined hereinbelow, mapit-all calculates an intermediate score using formula (8):

$$\max\ (f(w1,w2)/n1, f(w2,w1)/n2) \quad (8)$$

The intermediate score computed by equation (8) is clamped to a maximum value of 0.99. Next, this intermediate score is multiplied by 100 to yield an integer value between 0 and 99 inclusive, representing a score. Note that for a simple word vector analysis weights, f(w1,w2) is merely the dot product (w1.w2). For SFC weights, f(w1,w2) is normally (w1.w2)/(w1.w1+w2.w2−w1.w2). However, in a preferable embodiment any document in the claimlist which does not possess a sufficient number of SFC categories is downgraded: if the length of the shorter vector (I.E., sfc) n is less than 10 in a preferable embodiment, it is multiplied by (1.0−1.0/(n+1)). Note: since SFC is self-normalizing, normalization files are not used.

In a related embodiment, a cross-comparison algorithm takes the average of single versus merged claims and merged versus merged claims. For example, to implement the legal concept of patent infringement as applied to sets of patents or patent applications, in a particular embodiment, a similarity matching algorithm treats the exemplar part of a patent claim differently from the dependent parts of the claim. Thus, a kind of "cross-comparison" matching is used, wherein the combined scores for (1) patent A, claim X dependent and independent part(s) vs. patent B, claim Y, independent part and (2) patent A, claim X dependent and independent part(s) vs. patent B, claim Y, dependent and independent part(s), generate an aggregate matching (or similarity) score for patent A, claim X vs. patent B, claim Y.

In cross comparison processing, weights, from either word vector analysis or SFC analysis, are compared from the single file, block 54 of FIG. 2A, and the merged file, block 56 of FIG. 2A. For example, document 1 with weight vectors w1s in the single file and w1m in the merged file is cross compared with document 2, having weight vectors w2s in the single file and w2m in the merged file. The cross comparison score is basically an average of two combination functions of single and merged weights, computed according to formula (9):

$$f(w1,w2)=(f(w1s,w2m)+f(w1m,w2m))/2.0. \qquad (9)$$

Figure 2B:
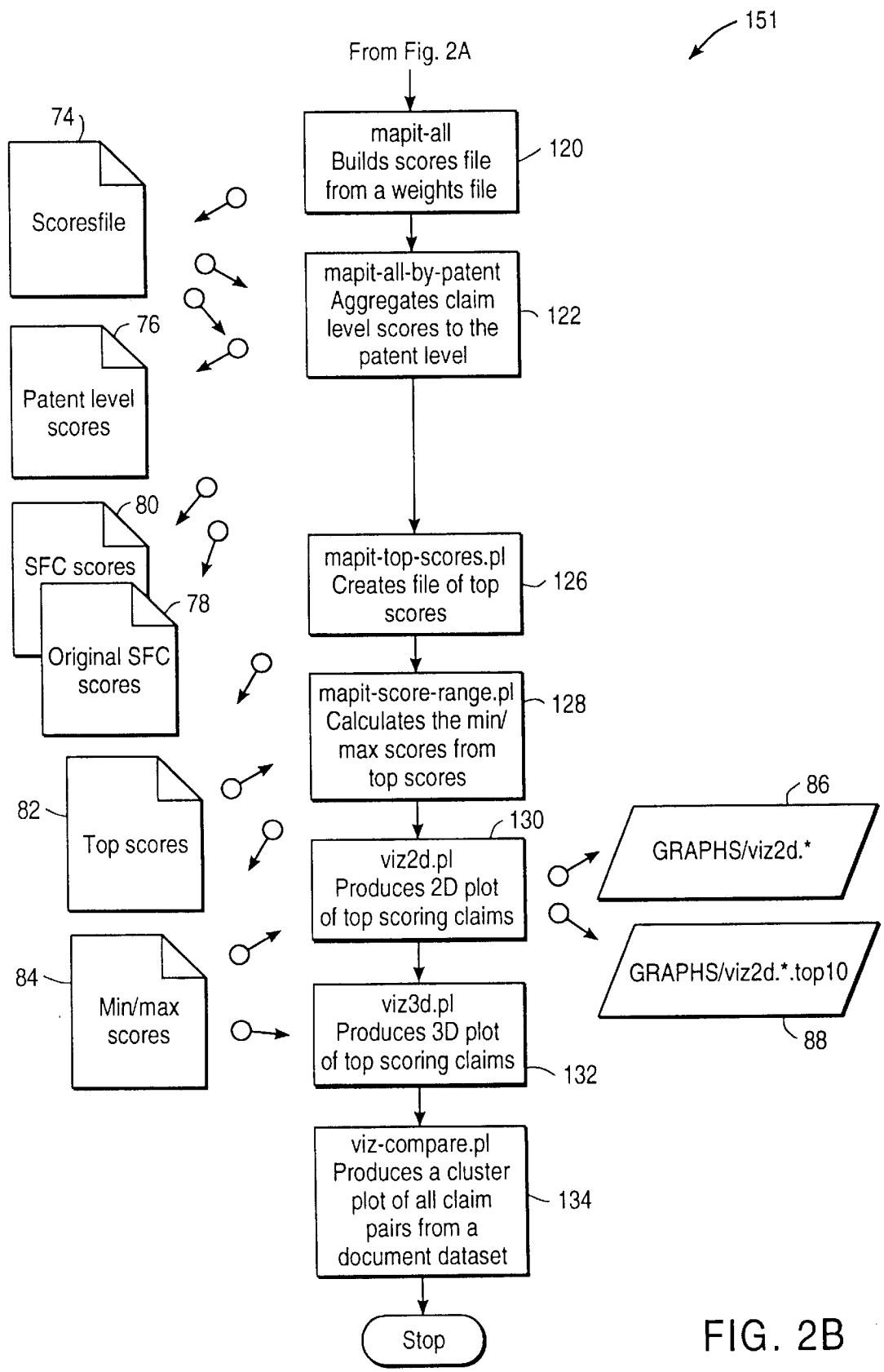

Following step 120 of FIG. 2B, mapit-all-by-patent step 122 aggregates claim level scores to the patent level producing a mapit.*.pscores file 76. In a preferable embodiment the score for patent p1 versus patent p2 is the top scoring pair of any claim from p1 against any claim from p2. Mapit-all-by-patent implements a "search patents by best claim" function in the preferable embodiment of the invention. The other patent level search, "search patents by all claims" is achieved by performing a regular query against the justclaims data set (i.e., all justclaims files 50 of patents in the associated search set) instead of the top scoring claim in the justclaims data set.

Following step 122, retrofit-sfc step 124 adjusts and weights the SFC scores held in file mapit.*.scores 74 for a body of documents based on feedback information from word vector analysis scores, also held in file 74. Retrofit-sfc step 124 creates a new mapit.sfc.scores file 80 moving the old information to mapit.sfc.scores.orig 78. For a wordvec score W and an SFC score S for two documents, step 124 calculates a revised SFC score using the following formula:

$$\text{weight}=a*\log(bW) \qquad (10)$$

If W>65, we add in an extra 4th root of (W−65)/100, so formula (10) becomes $a*\log(bW)+[(W-65)/100]^{1/4}$. The new SFC value gets multiplied by this weight (max value 1.0) as a damping function, and gets spread by a random amount also depending on W.

Referring again to FIG. 2B, mapit-top-scores step 126 writes the top N scores to an ASCII format file such as mapit.*.scores.top50k file 82. The rationale underlying this step is that large data file search time is expensive in terms of computing resources. Therefore, in a preferable embodiment, the system precomputes a manageable size score which is the system's "best guess" at what will be of interest to the user. In a preferable embodiment this is implemented by performing a mapit-extract step (i.e., step 300 of FIG. 4A), sorting the resulting file by score, determining the value of the Nth (i.e., lowest) score, doing a restricted mapit-extract step only down to that Nth score level, and sorting again.

Mapit-score-range step 128 takes as its input the mapit.*.scores.top50k file 82 and calculates the minimum and maximum scores for both word vector analysis and SFC type scores. It then writes this information to a standard output (STDOUT) which has typically been redirected to a mapit.*.scores.top50k.range file 84.

Following step 128, viz2d step 130 produces a two dimensional plot of top scoring claims, where a score indicates the relative similarity between two claims. Scores are based on word vector analysis. Simultaneously, claim information is aggregated to the patent level in order to depict relationships between patents based upon the similarity of their claims. Claim matches are aggregated together to provide a ranking method (based on a voting-type technique, a technique well known to those having ordinary skill in the art). For patents, this is useful in producing "company A vs. company B" type displays.

In a preferable embodiment, after the top matching pair of claims (i.e., the two claims having the most similarity) in the data set is found, the system rounds the score down to the nearest multiple of 5. Call this score X. Next, three regions are defined. The top region is defined as the rounded score to the rounded score +5 (x to x+5). The middle region is defined as the rounded score −5 to the rounded score −1 (x−5 to x−1). The bottom region is defined as the rounded score −15 to the rounded score −6 (x−15 to x−6).

For each pair of patents p1 and p2, a comparison is drawn for each claim from p1 against each claim from p2 and the following number of points are added to p1 versus p2. Ten is added if the two claims score in the top range. Five is added if the two claims score in the middle range. One is added if the two claims score in the bottom range. Zero is added if the score falls below the bottom range and it is not plotted. Claims falling into each range may be distinguished on the two-dimensional plot through any appropriate identifier such as color coding or symbols. For example, the top, middle and bottom ranges may be plotted with points having colors red, blue and gray, respectively.

All claims at or above the bottom range are plotted and the top ten patent pairs, as scored by the method described hereinabove, are labeled on the graph. The graph is written to a graphs/viz2d.* file 86 and the top ten patent pairs are also written to a separate graphs/viz2d.*.top10 file 88. In a preferable embodiment, step 130 employs the UNIX utility gnuplot to generate a postscript plot and then uses the gs UNIX utility to convert the output of the prior step to a ppm file, which is then converted to a gif file using ppm as is well known by those having ordinary skill in the art. An example of such a plot is provided in FIG. 8B.

Returning again to FIG. 2B, viz3d step 132 produces a three dimensional plot of top scoring claims while simultaneously aggregating claim information to the patent level. Its functioning is much the same as that of step viz2d 130. However, it gives a 3-D projection of the results and does not label the top ten matches on the graph. An example of such a plot is provided in FIG. 8C.

Finally, viz-compare step 134 produces a cluster plot (also referred to as a "scatter plot" of all the claim pairs from a data set. In contrast to viz2d step 130 and viz3d step 132, wherein the x-axis is one claim number, the y-axis is another claim number, and a dot is plotted if that pair of documents scores above the bottom threshold, the method of viz-compare is that the x-axis represents a wordvec score, the y-axis represents an SFC score, and a dot is plotted if there exists a pair of claims having the corresponding wordvec and SFC scores. An example of such a plot is provided in FIG. 8A.

Figure 8A:
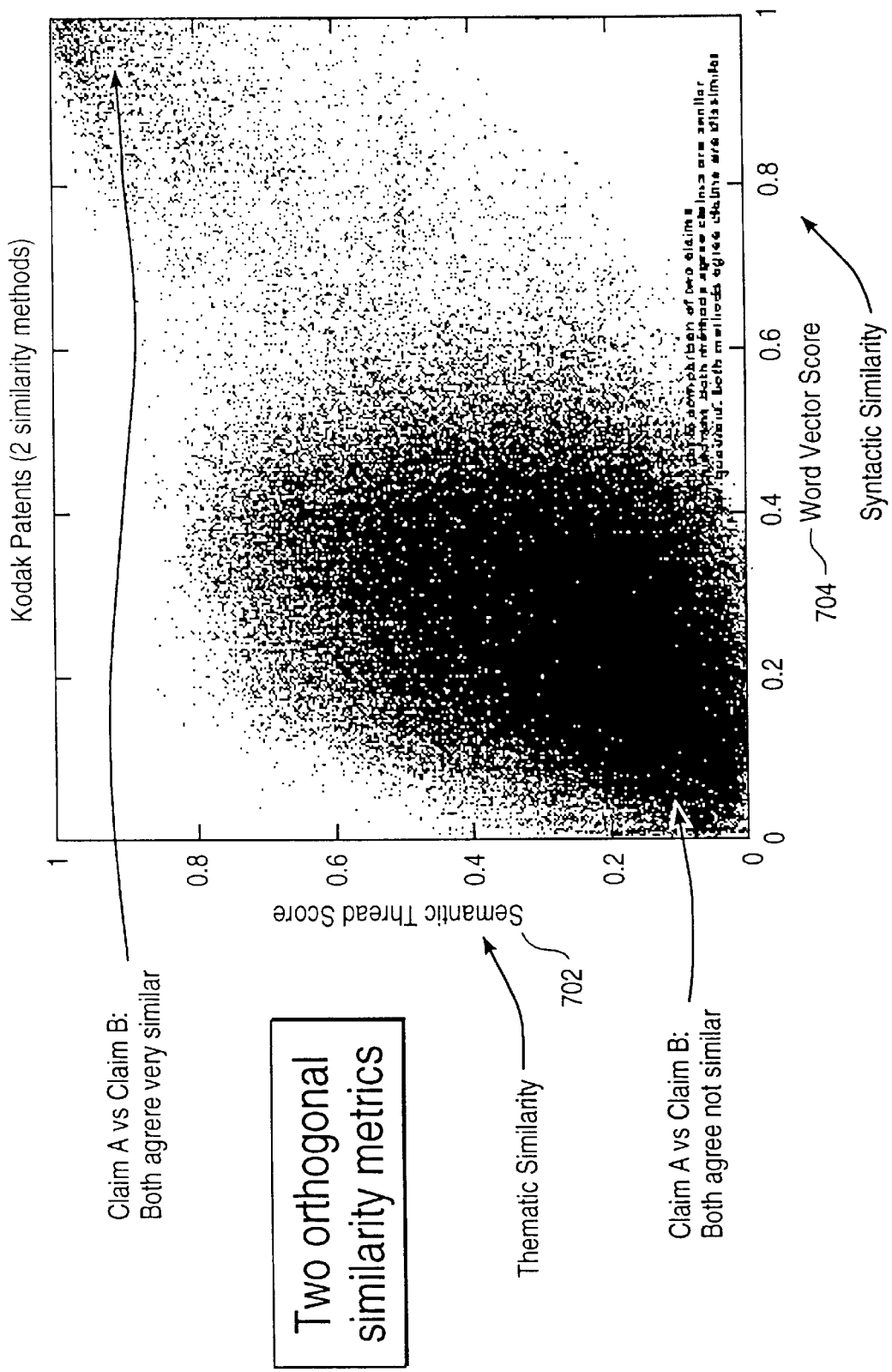
FIG. 8A illustrates a scatter plot visualization technique according to a particular embodiment of the invention.
Figure 8B:
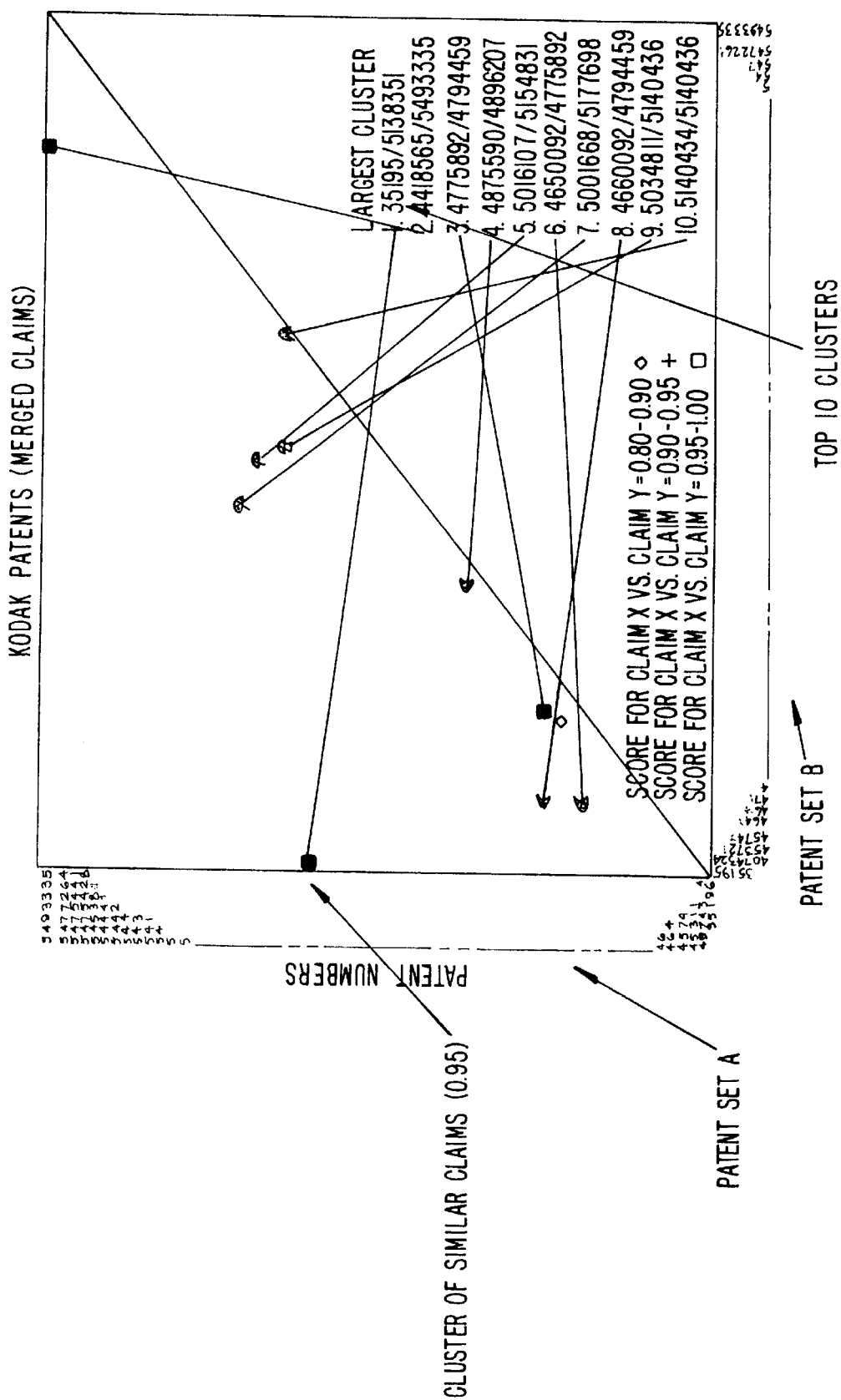
FIG. 8B illustrates a 2D plot visualization technique according to a particular embodiment of the invention.
Figure 8C:
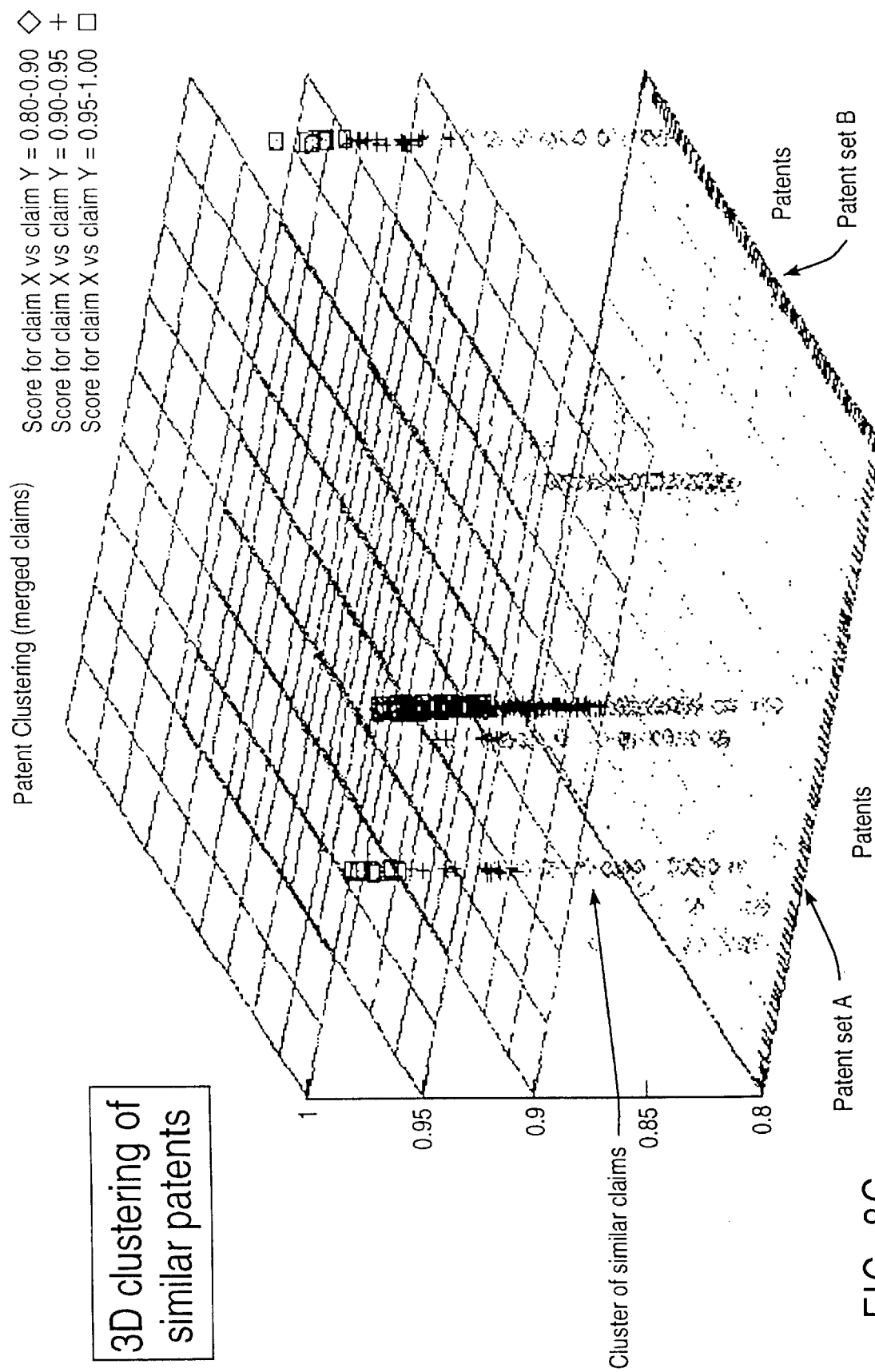
FIG. 8C illustrates a 3D plot visualization technique according to a particular embodiment of the invention.

The scores plotted in FIGS. 8A–8C are used to identify documents most closely or proximally related; i.e., "proximity scores". However, such scores may also be plotted to identify those documents that are most different or distally related; i.e., "distal scores". An example of the latter may be seen in FIG. 8D (discussed below). Such distal scores may also be plotted in the charts of FIGS. 8A–8C. As such, scores plotted to show relationships among documents are more generally referred to herein as utility measures.

In an alternative embodiment, a user of the system may select which plot type(s) desired by selectively engaging steps 130, 132 and/or 134 of FIG. 2B.

Having detailed the off-line processing component, we now turn to the on-line concept query processing aspect of the invention.

On Line Concept Query Processing

Figure 5:
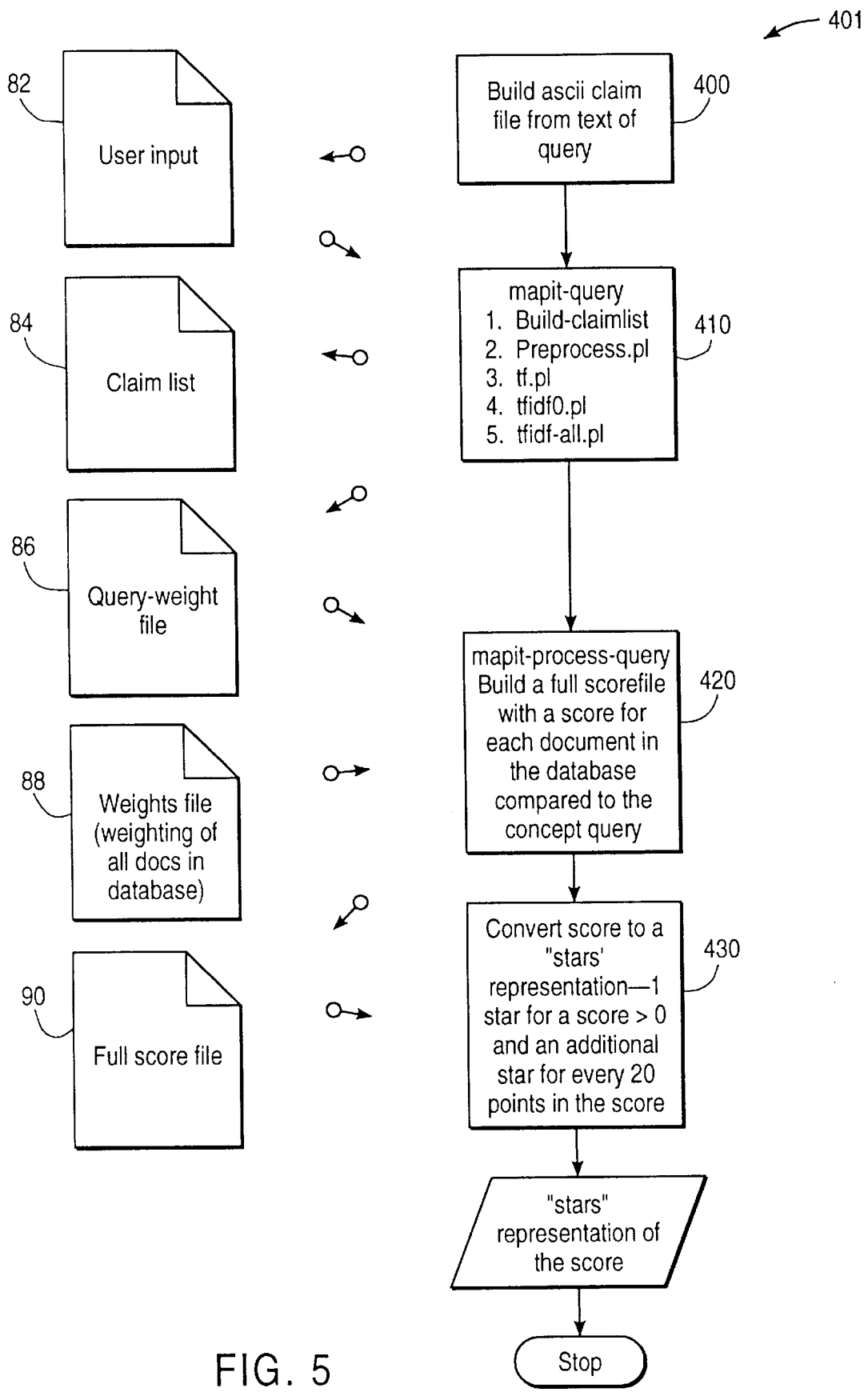
FIG. 5 depicts the on line concept query processing according to a particular embodiment.

In a concept query, as contrasted to a document query, the user has entered an arbitrary text string (which may be user-originated or copied from a portion or all of a document) which the system must match against the body of known documents to be analyzed (e.g., the dataset). Thus, many of the off-line processing steps described above must be performed against the on-line entered string to get the text into a usable format. Flowchart 401 of FIG. 5 depicts the online query processing. Initially, a user's query input to the system is written to an ASCII formatted file 82, pursuant to step 400.

Actual query processing is handled through a shell script, pursuant to mapit-query step 410. Mapit-query step 410 performs the following processing steps: 1) Build a claimlist, 2) preprocess, 3) tf, 4) tfidf0, and 5) tfidf-all. These are identical in function to the following steps in the off-line claims processing section described hereinabove: 1) "build claimlist" function of make-claims step 106 in FIG. 2A. The system builds a claimlist data structure 84 from the user's query stored as an ASCII format file 82, pursuant to step 400. The resulting structure is the same in format as claimlist data structure 12 of FIG. 2. 2) preprocess step 108 in FIG. 2A, 3) tf step 300 in FIG. 4A, 4) tfidf0 step 310 in FIG. 4A, and tfidf-all step 320 in FIG. 4A. The output of mapit-query is a set of scores from analysis of the user's query, which are written to a query weight file 86 typically named mapit.wordvec.*.scores.txt.

Following step 410, mapit-process-query step 420 builds a full score file 90 from input query weight file 86, containing the weights of word stems in the user's query, and a document weights file 88, produced during the off-line processing of the document database as described hereinabove, containing the weights of word stems in the document database. The full score file possesses one integer weight 0–99 for every document in a body or set of documents being processed. Each score has two components, a raw score and a quorum score. For any query weight vector q and document weight vector d, the raw score is simply the dot product of q.d normalized by dividing by the largest q.d$_i$ for all documents. This forces all raw scores to be within the range between 0 and 99, where the closest document to the query gets a raw score of 99 by definition. Note that mapit-process-query uses the query weights from the weight file 86, not the doc weights from file 88. The basic quorum score is computed as follows. The query has n unique terms and m of those terms occur in the current document, the basic quorum score is m/n. There are three ways to use the quorum score. 1) Specifying a "-no_quorum" option causes the system to ignore the quorum and to use the raw score as the final score. 2) Specifying a "-drlink_quorum" option causes the system to compute a weighted average of the two scores based on drlink coefficients (described in the above-referenced articles) and use this average as the final score, as calculated according to formula (11):

$$\text{final\_score}=2.9163(\text{raw\_score})+0.8492(\text{quorum\_score}) \quad (11)$$

In a preferable embodiment, a final normalization is performed by dividing by the largest final score in the dataset of documents to force all scores to be between 0 and 99. 3) By specifying a "-quorum option", the system selects from a multiple number of bins (a grouping of like scores) for each possible quorum value a final score based on the raw score. If a query has unique terms, then the final score is given by the formula:

$$\text{final\_score}=(\text{quorum\_score}-1/N)+(\text{raw\_score}/N) \quad (12)$$

In a preferable embodiment, method 3 is used.

Finally, in step 430 the results are converted into a "stars" representation. One star is given for any document with a score greater than zero. An additional star is given for every twenty points in a documents score. The stars are displayed to the user as a representation of the score.

In applications where a response time is critical and/or a large set of documents requirea searching, (e.g., based on weights and scores), well-known enhancements may be added to the system to increase processing speed such as use of index access method or other techniques to optimize fast storage and retrieval of data as are well known to persons of ordinary skill in the art.

In a further embodiment, documents are processed according to the off-line processing method described hereinabove to the point where plots are generated in accordance with steps 130–134 of FIG. 2B.

Off-Line Processing of Non-Structured (Generic) Documents

Figure 6A:
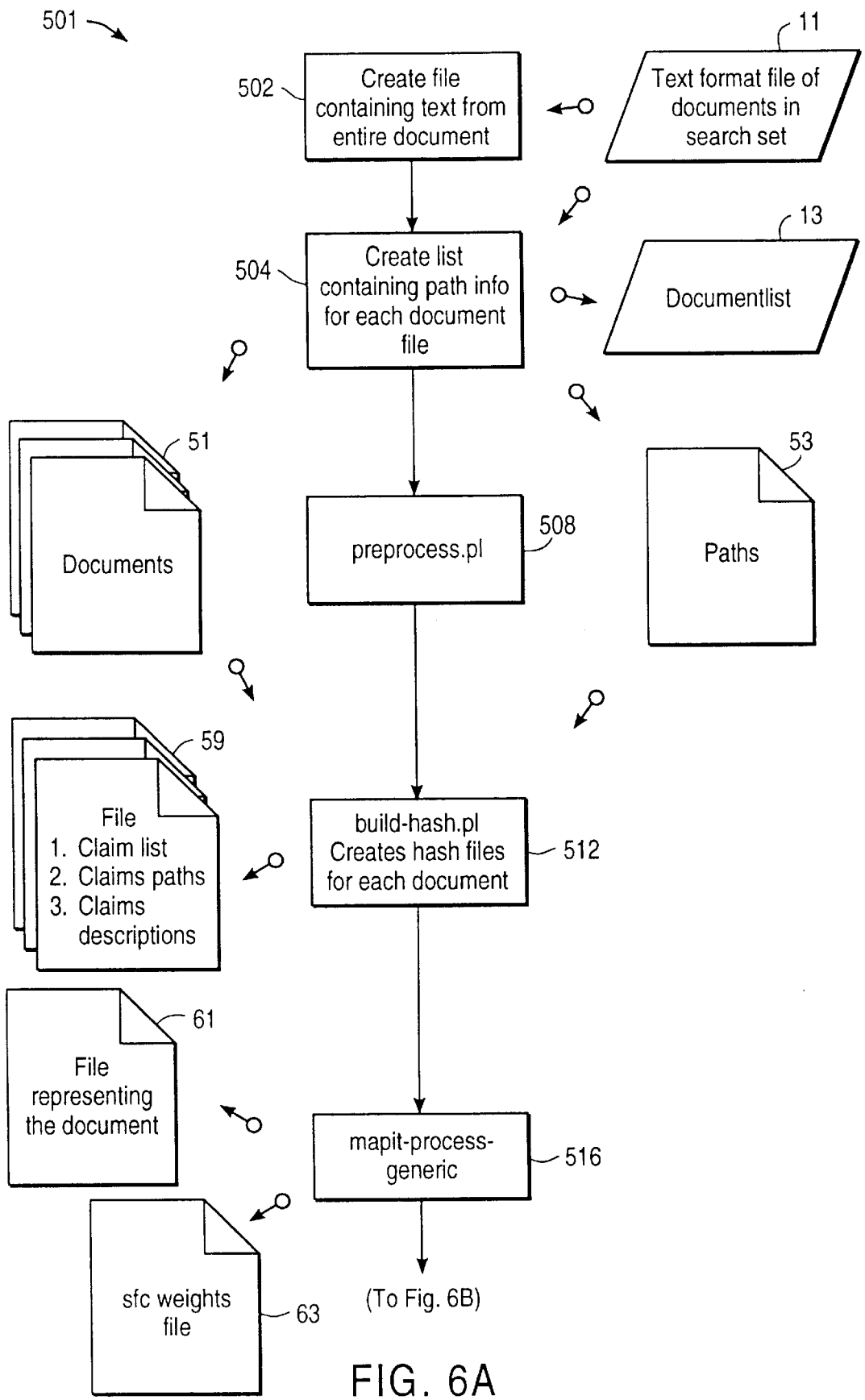
FIGS. 6A–6B depict off line generic document processing steps according to a particular embodiment.
Figure 6B:
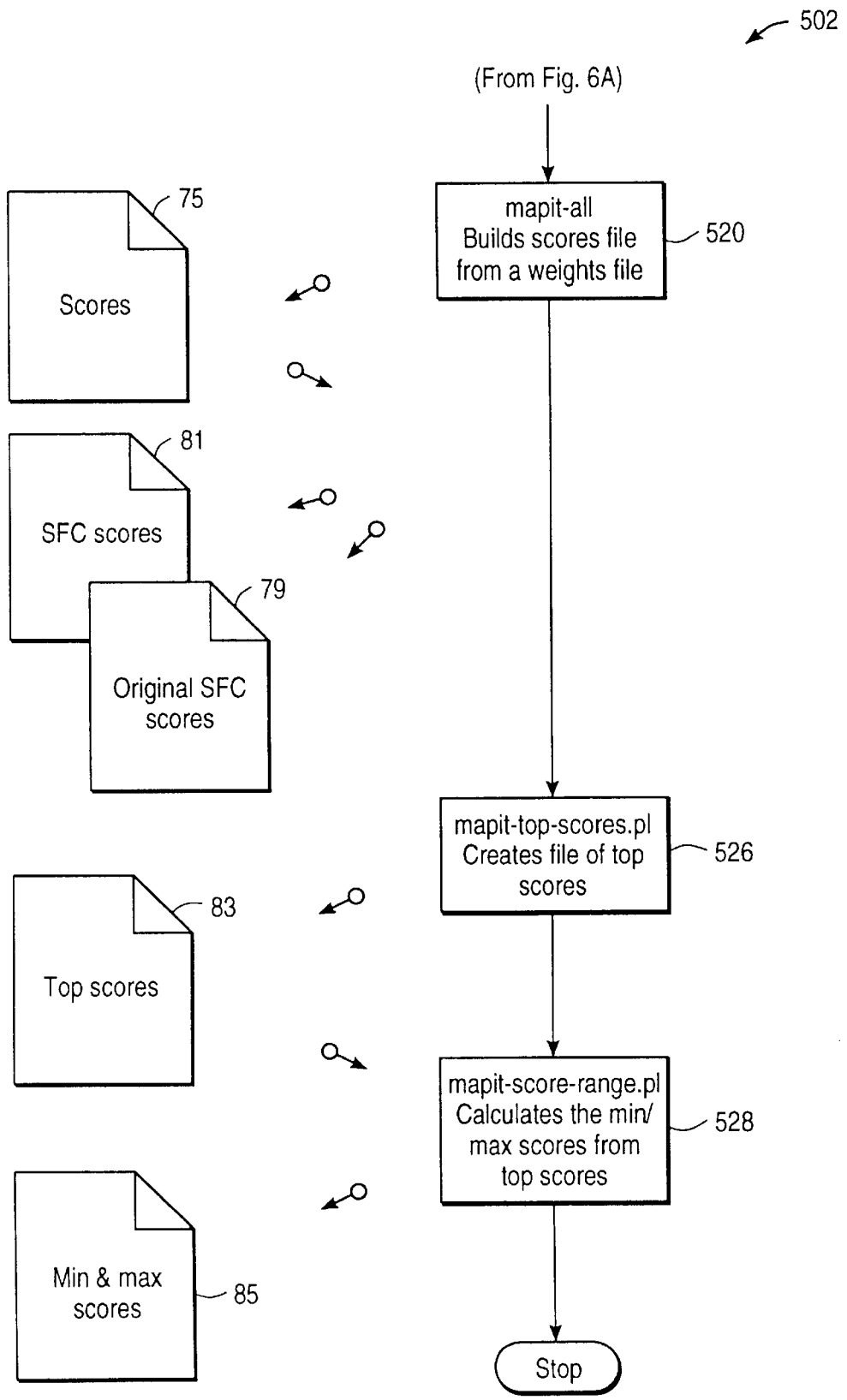

Flow chart 501 of FIGS. 6A and 6B describe off-line processing of non-structured or generic documents (e.g., technical publications, non-structured portions of structured documents (e.g., abstract and detailed description of patent), etc.). For the purposes of this discussion, FIGS. 6A and 6B are compared to FIGS. 2A and 2B to highlight the differences between off-line processing of structured documents, and off-line processing of generic documents. Off-line generic document processing begins with creating a file containing the text of the entire document, pursuant to step 502. This file may be ANYNAME whatsoever. Input to this file is a text formatted file 11 containing documents in the subject search set. Output is an ANYNAME text file 51. Following step 502, an ANYNAMELIST file 53 is created pursuant to step 504. File 53 contains the full directory path name for each document in file 51. Comparing off-line generic document processing with off-line structured document processing indicates that there is no analog to the make-claims step 106 in generic document processing. Furthermore, single file 54 and merged file 56 outputs of the structured document processing make-claims step do not exist in the generic document processing.

Processing continues with preprocess step 508. Preprocess step 508 is virtually identical to preprocess step 108 (FIG. 2A) of off-line structured claim processing. Preprocessing is described in detail in FIG. 3 as well as hereinabove. Processing continues with step build-dbm 512 (build-claimlist step 110 is omitted from flow chart 501), which creates hashed DBM files 59. These files are a subset of the DBM files 60 created in structured document processing and include: 1) claimlist; 2) claimlist_path; and 3) claimlist_desc. The fix-patentlist step 114 of structured document processing (FIG. 2A) is omitted in the generic document processing of FIG. 6A. The generic processing continues with mapit-process-generic step 516. The mapit-process-generic step is virtually identical to the mapit-process step 116 of structured claim processing. Mapit-process is described in detail in FIGS. 4A and 4B and herein above. The output of mapit-process-generic step 516 includes a mapit.sfc.*.TWFMT file 61 and a mapit.sfc.weights file 63. These files are identical to files 60 and 62, respectively, of FIG. 2A. Off-line generic processing continues on FIG. 6B with mapit-all step 520 which builds a mapit.*.scores file 75 from a weights file 63. Since there are no structured elements such as claims in generic documents, there is no equivalent to the mapit-all by patent step 122. So generic document processing continues with retrofit-sfc step 520, which functions as its counterpart retrofit-SFC step 124 in FIG. 2B. Retrofit-SFC step 520 applies word vector analysis information to the SFC weighted scores, producing a new SFC score file 81 and saving the original information in an original file 79. The processing continues with mapit-top-scores step 526 which creates a file of top scores; i.e., mapit.*scores.top50K file 83. Finally, mapit-score-range step 528 computes the minimum and maximum scores and writes them into mapit.*.scores.top50k.range file 85. This information may be output as an individual data file using conventional means.

"Generic" documents in this context may include claims treated as a generic document (i.e., without parsing) compared with other portions of a patent (e.g., summary, abstract, detailed description, etc.).

In an alternative embodiment, it is contemplated that plot generation including two dimensional, three dimensional and cluster will be available with generic document processing. This feature will be enabled in accordance with the methodolgy discussed above for structured document processing.

Claim Parsing According to a Specific Embodiment

Figure 7A:
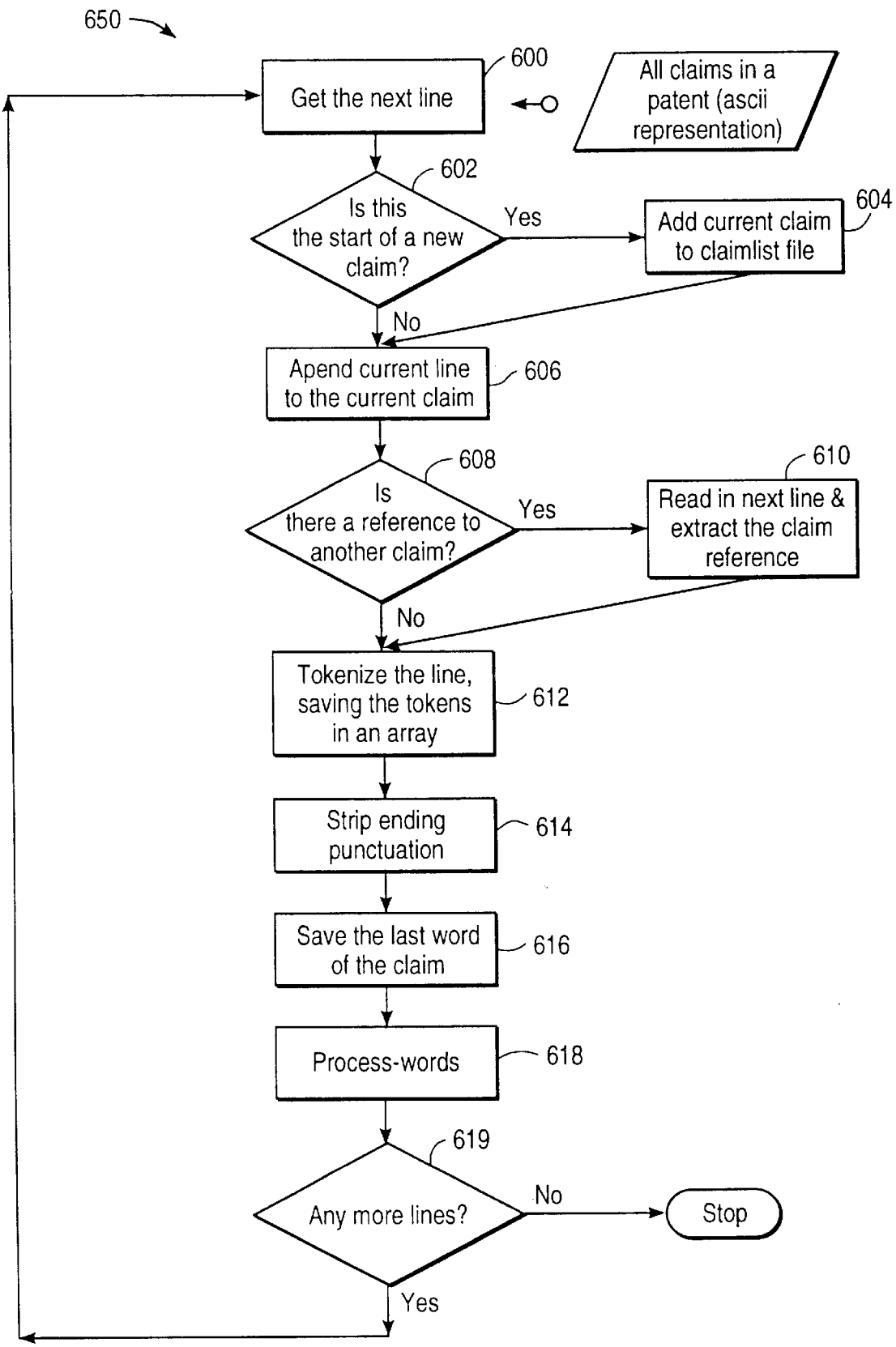
FIG. 7A depicts claim parsing according to a particular embodiment.

Flow chart 650 of FIG. 7A depicts a method of parsing claims according to a specific embodiment of the invention. In a preferred embodiment, the method of flow chart 650 is employed by step 106 of FIG. 2A to create files 54 and 56. The input to the claims parsing process is a single file containing a set of all claims from a patent (e.g., justclaims 50). The output is a single file and a merged file for each claim. The single file will contain only the body of a single claim. The merged file will contain the body of the single claim in addition to the transitive closure of all claims referenced therein. These files are identical to files 54 and 56, respectively, of FIG. 2A.

The process reads claims from the justclaims input file 50, one line at a time in the "get the next line" step 600. The system then determines if the line read in step 600 is the start of a new claim in step 602. New claims are indicated to the system by a fresh line starting with a claim number followed by a period, a space and the claim text. Claim numbers must be sequential and begin with the number 1. If the system detects the beginning of a new claim then the system will add the current claim that it had been processing to the claim list file 12 (list of document names) in step 604. Otherwise, or in any event, in step 606 the system appends the current line read in from the file to the current or new claim body. Next, the system will determine whether another claim is referenced in the current line read in from the file, pursuant to step 608. If a reference is indicated, the system will read in the next line from the input file in step 610. This is done in case the reference crosses a line boundary. The system will also try to identify claim references in step 610. Note that there are two simplifying assumptions. Number one, claim references never run more than two lines. Number two, a new claim reference is never detected on the second line which continues to the third line.

In the alternative, or in any event, the system tokenizes the line saving the tokens into an array pursuant to step 612. All matter in the line up to the word claim is discarded. For example, in the line, "5. The method of claim 1", this step would eliminate all text prior to the word "claim", i.e., "5. The method of". Tokens are not split based upon punctuation because it creates extra tokens. Ending, or trailing punctuation is removed from the end of words in step 614. The last word in the line is saved in a variable "last_word" in step 616 to facilitate the check for the words "preceeding" or "previous" in step 622 of FIG. 7B.

Having tokenized the line into words, the system will now invoke process words in step 618, as described below, to look for references to other claims within the line. Upon completing step 618, a determination is made as to whether there are any more lines in the input file (i.e., just claims 50) in step 619. If yes, control returns to step 600 to process the next line in the current or a new claim. If not, parsing is complete for the set of claims of the subject patent and parsing processing stops (unless another patent is to be processed).

Figure 7B:
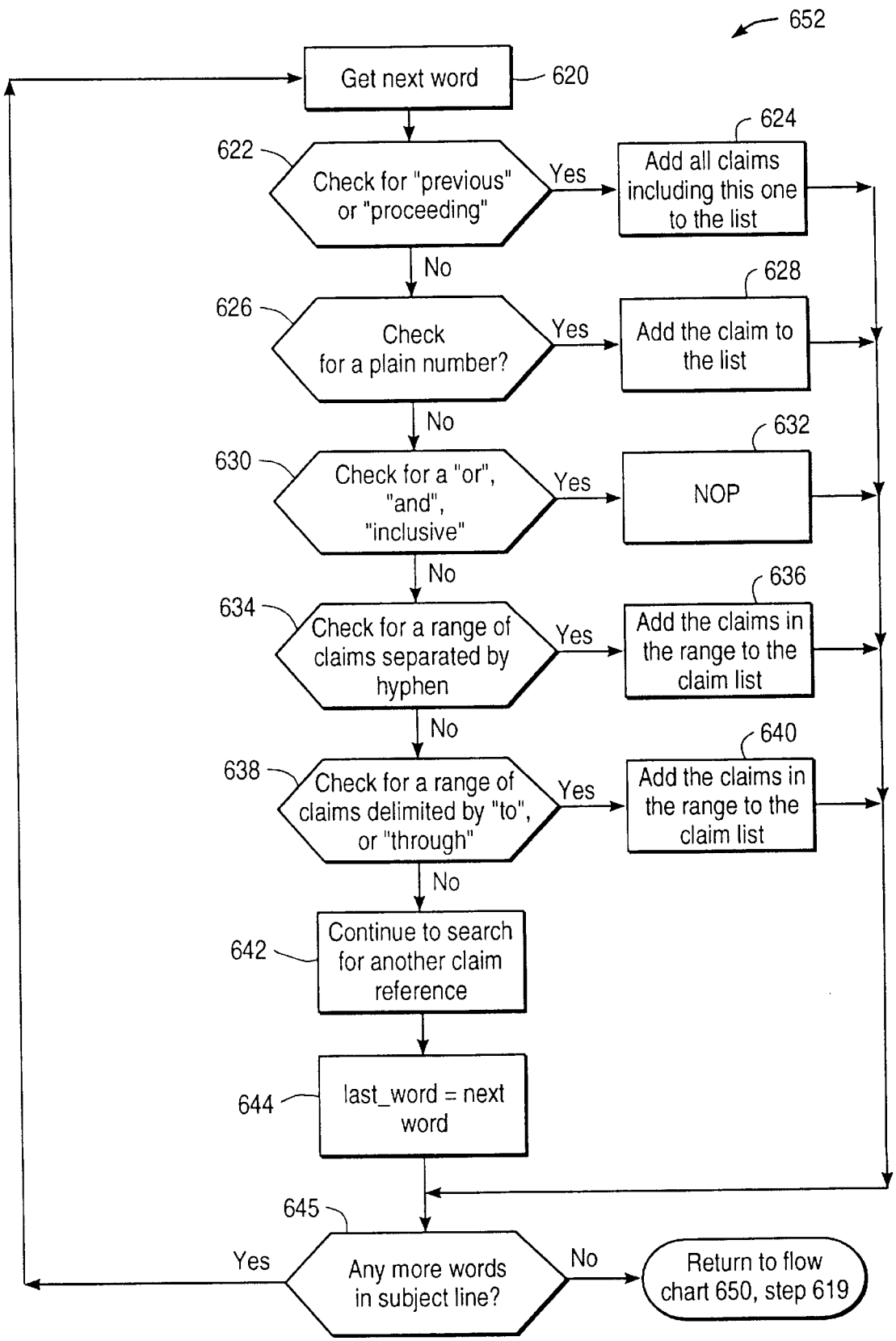
FIG. 7B depicts the process-words step of claim parsing of FIG. 7A according to a particular embodiment.

Referring to flow chart 652 in FIG. 7B, words in the array are processed serially beginning with the "get next word" step 620, which fetches a current word. The system checks for the existence of the word "previous" or "proceeding" in step 622. If the "last_word" was previous or proceeding, then the system understands this to indicate that it should add all claims including this one to claim list file 12 in step 624. In the alternative, processing proceeds with the system checking for a plain (i.e., arabic) number in step 626. If the system detects a plain number then the system understands this to indicate that a new claim has been found, and that the current claim should be added to claim list file 12, pursuant to step 628. In the alternative, the system next checks the current word for an "or" an "and" or an "inclusive" in step 630. If the system detects the presence of either of these three words this word is skipped and no processing is done in step 632. In the alternative, processing proceeds with examining the current word for a hyphenated range pursuant to step 634 (for example, claims 4–19). If the system detects the presence of a hyphenated range, the system adds the claims in the range to claim list file 12, in accordance with step 636. In the alternative, processing proceeds to check for the existence of a range delimited by the words "to" or "through" in step 638. If the system detects a "to" or a "through" delimited range, the system adds the claims in the range to claim list file 12, pursuant to step 640. In the alternative, the system detects the condition that there is nothing more to reference. At this point, the system has detected that this is the end of the claim reference. Processing continues with the system searching for another claim reference within the subject line, pursuant to step 642. Next, in step 644, the current word is saved in the "last_word" variable. The system next determines whether there are any more words in the subject line being processed, pursuant to step 645. If not, control returns to step 619 of flow chart 651. Otherwise, in preparation for another iteration through the loop, control flows back to the beginning of the process-words step, where the "get next word" step 620 is executed to process the next word in the set of words.

Ultimately, when all of the words in a line are reached, control flows to step 619 in FIG. 7A, which detects if the last line of the claim has been processed. If so, processing halts for this claim. Otherwise, control returns to the get-next-line step 600.

Graphical Display and Visualization of Analysis Results

According to a particular embodiment of the invention, there is a plurality of formats in which to display and analyze document data, examples of which are illustrated in FIGS. 8A–8D and described hereinbelow.

Typical clustering techniques, known in the art, represent documents as points in an n-dimensional display, wherein each point corresponds to a single document and each dimension corresponds to a document attribute. These clusters are then typically displayed as graphical images where related documents are indicated by spatial proximity (sometimes further distinguished by color or shape). Examples of this sort of clustering include the "Themescape" type displays from Battelle, a corporation with headquarters in Columbus, Ohio.

Contrastingly, according to the invention, clustering is performed using a single point in n-dimensional space to represent a pair of documents, rather than a single document. Each dimension represents a separate metric measuring the similarity of the two documents. By using different sets of orthogonal metrics, clustering of underlying documents can be performed in different ways to highlight different features of the overall collection.

A set of metrics can be selected for display. For example, FIG. 8A depicts two orthogonal similarity metrics which scores: thematic similarity 702 (in the form of semantic thread score or SFC-type score) identifying documents about the same topic even if they use different terminology, and syntactic similarity 704 (in the form of word vector score) which identifies documents that use the same terms and phrases. These metrics may employ differing matching techniques. For example, a subject field code (SFC) vector technique may be combined with a space metric based on TF.IDF weighted term occurrences.

Preferably, thematic similarity is determined employing SFC techniques described by Dr. Elizabeth Liddy in the above-referenced articles. Further, syntactic similarity is determined through word-vector analysis using TF.IDF techniques, which are well known to those having ordinary skill in the art and more further described in the Salton reference, which is hereby incorporated by reference in its entirety for all purposes. In a preferable embodiment this set of metrics is displayed visually as an x-y scatter plot, as in FIG. 8A, although clusters can be displayed within larger dimension sets by using additional graphical attributes such as 3D position, size, shape, and color.

Many systems use a combination algorithm to collapse multiple similarity measures into a single value. According to the invention, the individual similarity components in the visual display are retained, allowing the user to interpret the multiple dimensions directly. For example, for certain patent applications, it may be useful to identify document pairs that are similar across both dimensions, while for other applications it may be more important to identify cases where the two similarity scores differ. The user can interactively explore the visualization by using a mouse or other input device to indicate either a single point (a single pair of documents) or regions of points (a cluster of document pairs). The documents represented by these points can then be displayed, either by presenting full text or by presenting identifying attributes such as title and author. The ability to cluster and display documents using multiple similarity measures simultaneously would be lost if everything were collapsed to a single score.

Scatter Diagram

FIG. 8A illustrates a scatter plot for drawing inferences from A vs. B types of analyses according to the method described above in the viz-compare step 134 of FIG. 2B. A collection of documents may be split into two sets, for example, patents from Company A and patents from Company B. Paired Proximity scores are developed, using the method described hereinabove, one score for every document in set A against every document in set B, and the other score for every document in set B against every document in set A.

In the scatter plot, the x-axis represents relative similarity according to a syntactic or word vector based score. The y-axis depicts relative similarity based on a conceptual or semantic thread based score. In a split dataset, each document from the first dataset is compared against the documents of the other dataset, resulting in a score represented by a point in the space defined by the syntactic and semantic axes. Documents which are highly similar according to word vector based analysis will appear farthest to the right on the plot. Documents having the highest similarity according to a semantic based analysis will appear at the top of the plot. Documents having the greatest similarity to one another based upon both word vector and semantic thread score will appear in the upper right hand corner of the plot. Documents having the least amount of similarity according to both word vector and semantic scores will appear in the lower left hand corner of the plot.

In a related embodiment, the highest proximity scores for each document in set A against entire set B, and highest proximity scores for each document in set B against entire set A are determined.

In a related embodiment, zooming-in or zooming-out in a scatter plot increases or decreases the resolution and range/domain of the plot.

2-D Diagram

FIG. 8B illustrates a 2D visualization of an analysis conducted on two sets of patents according to the method described in the viz2d step 130 of FIG. 2B. In the 2-D plot, the x-axis exhibits the patents in the dataset as monotonically increasing sequence of patent numbers. The y-axis is identical to the x-axis. Clusters of the most similar patents within the dataset are plotted on the graph. Clusters with scores falling within the 95 to 100 range are plotted with a square. Clusters with a score falling within the 90 to 94 range are plotted with a cross. Clusters with a score falling within the 80 to 89 range are plotted with a circle.

In a related embodiment, color is added to the 2D, orthogonal similarity plot according to various criteria. For example, if the user types in a search concept "digital image segmentation and edge detection," patent components shown in the plot will change color (or some other display appearance attribute) according to the strength of presence of this concept in the data. This may be carried out with an overlay plot applied to the 2-D diagram.

3-D Diagram

FIG. 8C illustrates a 3D visualization of an analysis conducted on two sets of patents according to the method described in the viz3d step 132 of FIG. 2B. The 3-D diagram depicts the same information as the 2-D diagram only in a three dimensional format. The x-axis and y-axis both are delienated by monotonically increasing numbers of the patents in the dataset. The z-axis represents a ranged degree of similarity of the patents. Scores based on the similarity of clusters of patents are plotted in the 3-D framework with the same graphical representations as in the 2-D plot described hereinabove. (i.e., scores within the 95 to 100 range are depicted as a square; scores within the 90 to 94 range are depicted with a cross; scores falling within the 80 to 89 range are depicted by a circle).

S-Curve Diagram

Figure 8D:
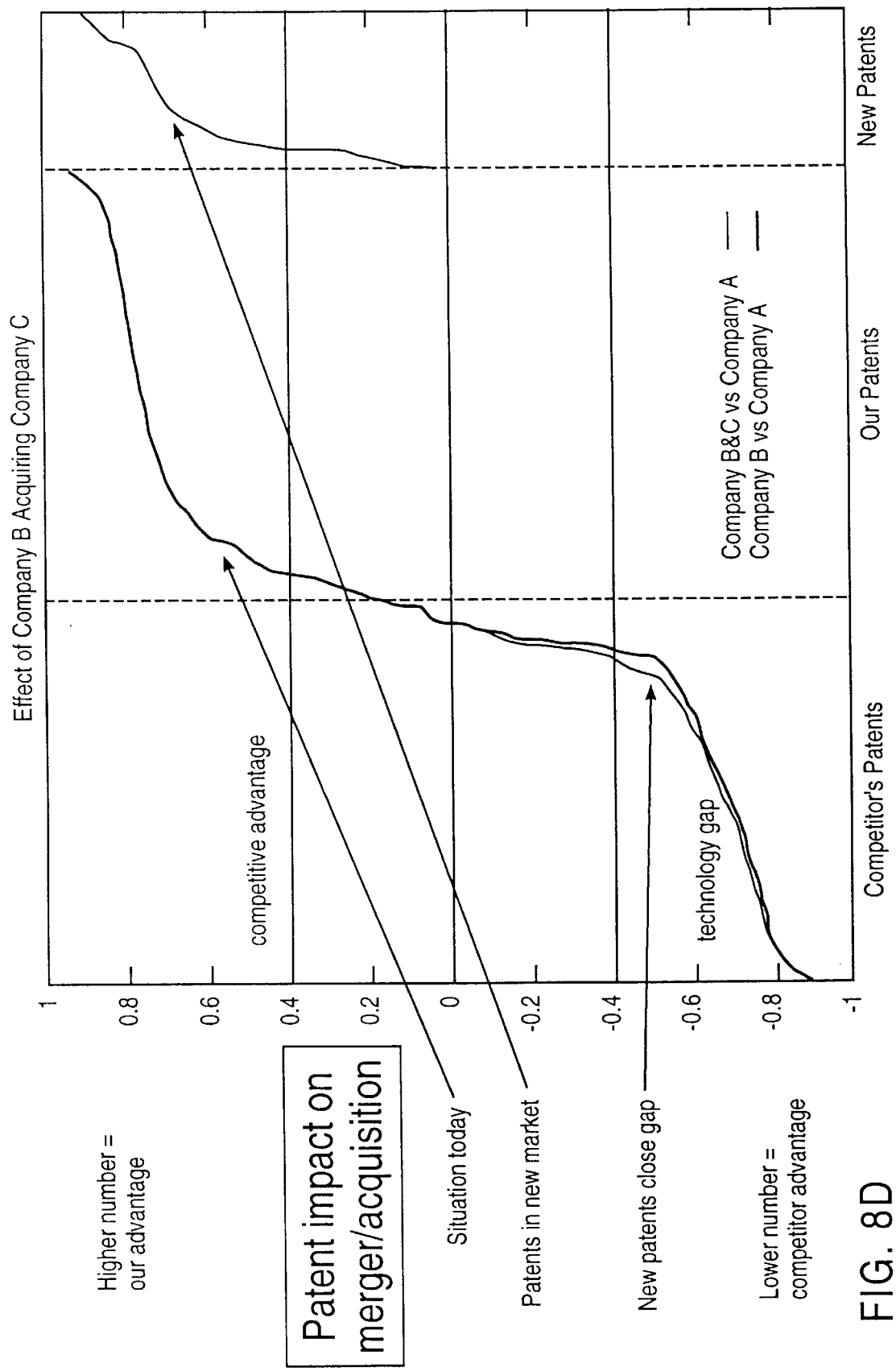
FIG. 8D illustrates an S-curve plot visualization technique according to a particular embodiment of the invention.

FIG. 8D illustrates an S-curve plot for drawing inferences from A vs. B types of analyses. In this method of displaying data analysis results, documents from dataset A are plotted on the left hand side with low proximity scores having negative values with large absolute values, and where documents from dataset B are plotted on the right hand side with low proximity scores having positive values with large absolute values. In other words, plot (score−1.0) for set A documents and (1.0−score) for set B documents, then sort and plot to yield an S-shaped curve).

Figure 8E:
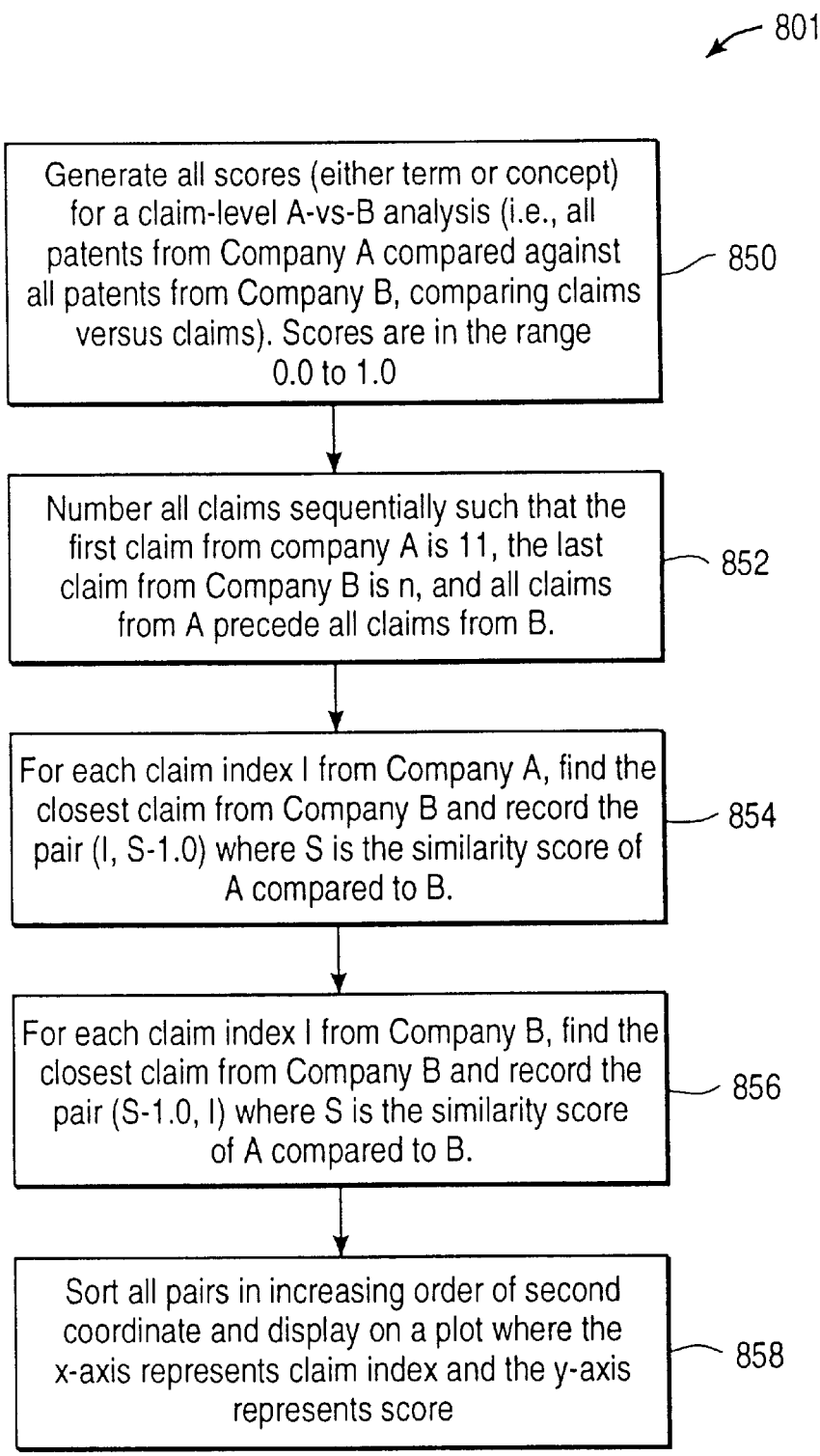
FIG. 8E is a flow chart depicting the steps for generating an S-curve plot.

FIG. 8E illustrates the steps to produce the S-curve. The process depicted in the flow chart 801 begins with the generation of all scores either term or concept from a claim level data set A versus data set B analysis 850. For example, the patents from Company A compared with the patents from Company B on a claim by claim basis. These scores are in the range of 0.0 to 1.0. Next, in step 852, all claims are sequentially numbered such that the first claim from Company A is 1 and the last claim from Company B is n and all claims from A precede all claims from B. In step 854, for each claim index I from Company A find the closest claim from Company B and record the pair (I, S−1.0), for S is the similarity score of A compared with B. Next, in step 856, for each claim index I from Company B find the closest claim from company A and record the pair (I, 1.0−S) where S is the similarity score of A compared to B. Finally, in step 858, sort all pairs in increasing order of second coordinate and display on a plot where the x-axis represents the claim index and the y-axis represents the claim score.

The result is a plot in the form of an S-curve where the bottom part of the S represents claims unique to company A; the middle part represents claims with possible overlaps between the two companies, and the top part represents claims unique to Company B.

In a related embodiment, the S-curve method of displaying data is extended to analyses wherein additional documents are added to sets A and/or B and reanalyzed. The resulting graph is overlaid on top of the original graph. This permits the user to track changes over time, for example where changes in the shape of an S-curve of patent portfolios represent changes in the technology holdings of one company relative to the other.

Techniques for Analysis of Documents

Figure 9A:
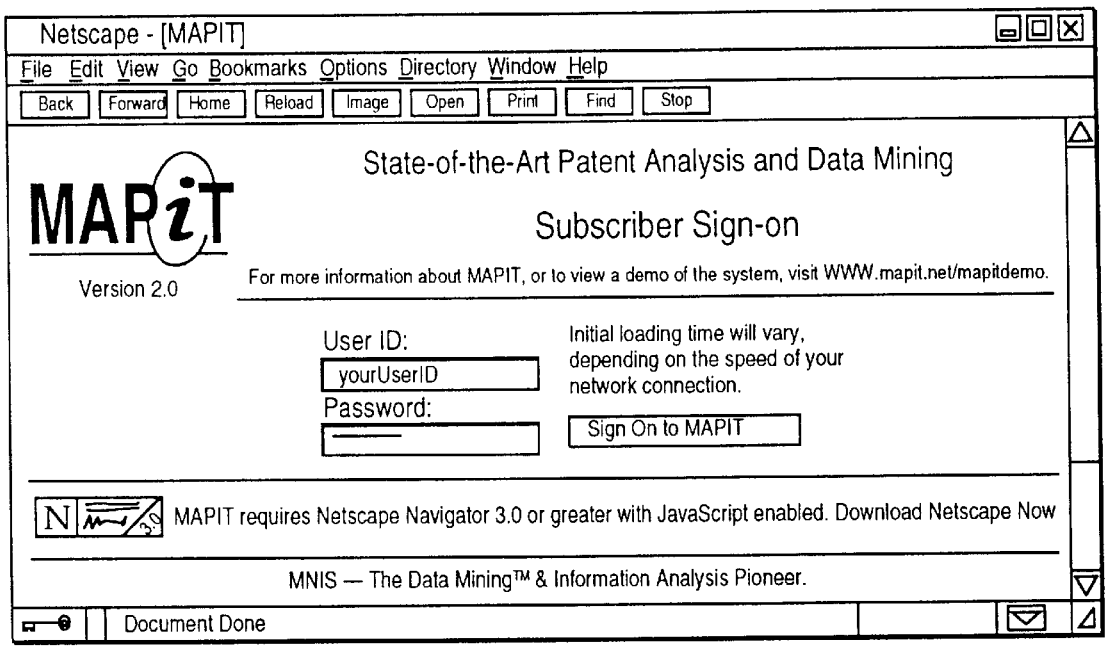
FIG. 9A illustrates a representative sign on screen according to a particular embodiment of the invention.
Figure 9B:
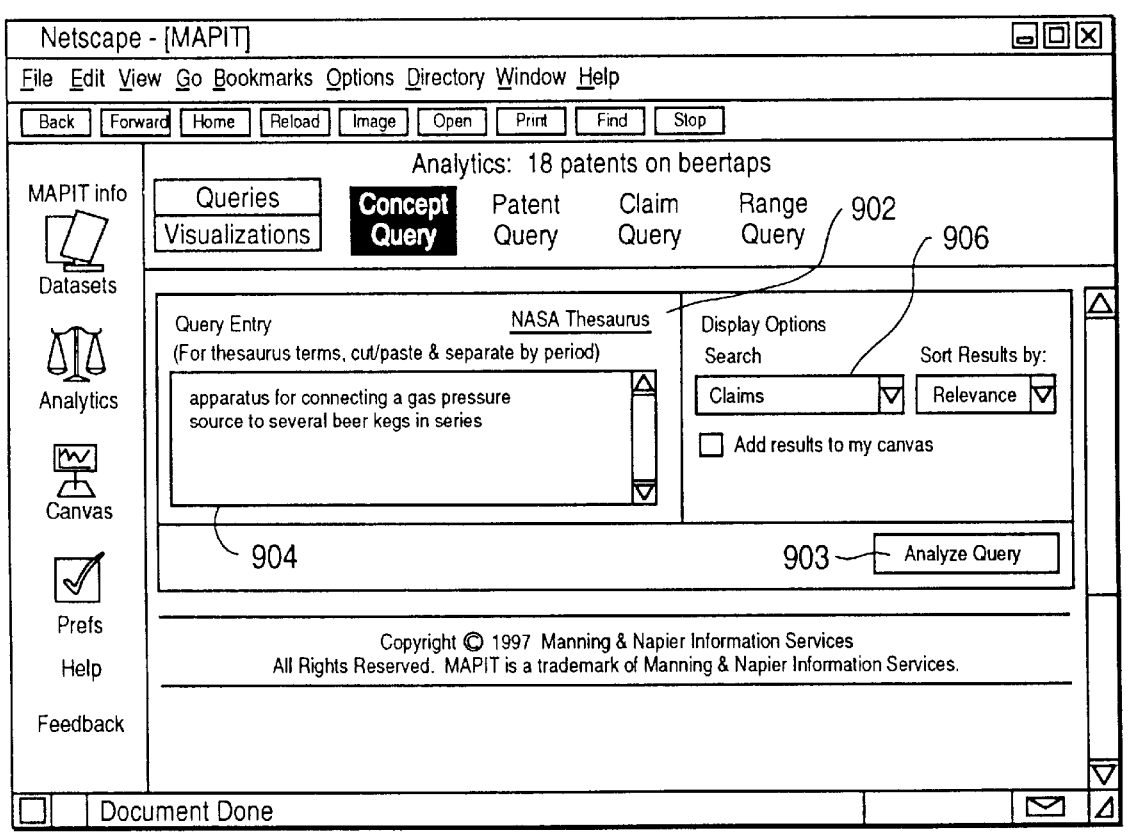
FIG. 9B illustrates a representative concept query screen according to a particular embodiment of the invention.

Screens and automated tools incorporated in a specific embodiment of the invention enables a user to perform detailed study on analysis results of the system. FIG. 9A, for example, depicts a representative sign-on screen for a user according to the invention. Screens are produced using the NetScape NetBrowser interface to the worldwide web. The reader of ordinary skill in the art will appreciate that other web browsers and other programs may be used as a user interface to the patent analysis aspect of this invention. The user enters a user I.D. and password in the screen depicted by FIG. 9A to sign-on to the system described herein. FIGS. 9B, C, D, E, and F depict representative screens in accordance with the performing of a concept query as described herein above. The concept query entry screen depicted in FIG. 9B enables the user to enter in English text, a description of a concept which the system will search for in the database of patents. The concept entry screen has fields which enable the user to specify a job I.D. for billing purposes and to search sections by abstracts or claims and also to control the order of sorting.

FIG. 9C depicts the concept query review screen which depicts the results of the stemming operations described hereinabove as applied to the user's concept query which has been entered in the screen on FIG. 9B. For each stemmed word and phrase entered in the concept query, the concept query review screen indicates the number of hits or findings of that stemmed word or phrase within the dataset under search and further breaks this information down to depict the number of hits in the claims aspects of patents under search and the abstract aspects of patents under search. By selecting the "show results" button on the screen, the user may go to the "concept query results" screen depicted in FIG. 9D.

Figure 9E:
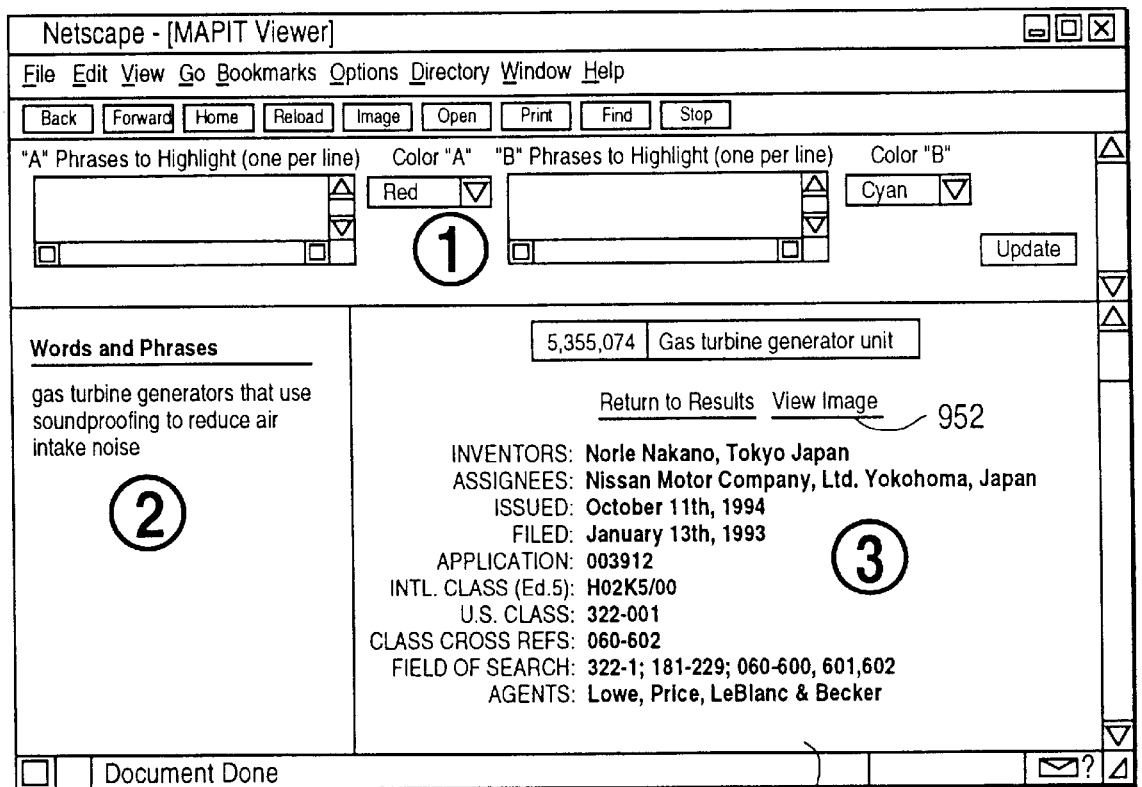
FIG. 9E illustrates a representative concept query results viewer screen according to a particular embodiment of the invention.
Figure 9F:
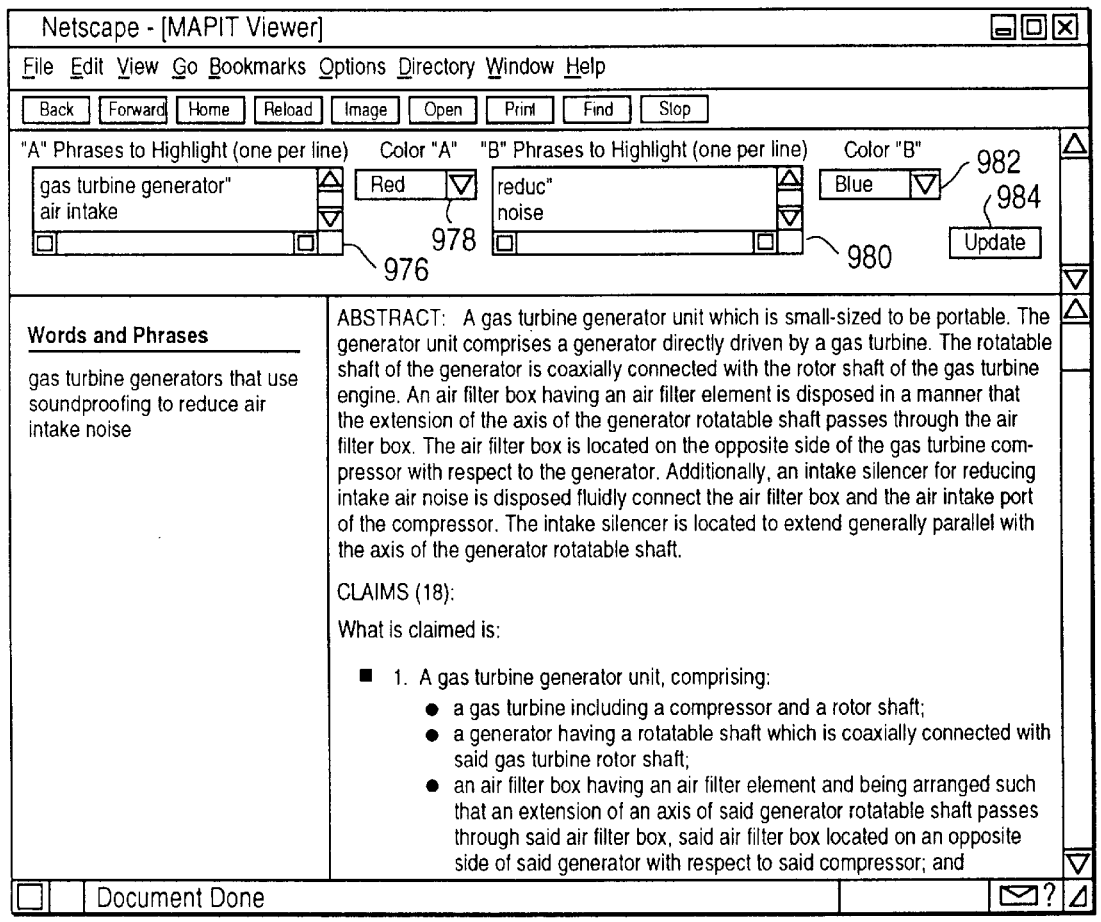
FIG. 9F illustrates a representative concept query results viewer screen depicting a side-by-side comparison according to a particular embodiment of the invention.

The concept query results screen gives the results of the user's search as applied to the database of patents. In the representative query depicted in FIG. 9D, the patents are listed in order of decreasing relevance to the user's concept query. Patents are ranked in numerical order and the patent number is given along with the title and an assignee. Next, the user may by clicking on the patent number, move to the screen depicted in FIG. 9E which indicates all matter associated with the patent that may be of interest to the user. For example, there is an abbreviated section describing the inventors, assignees, filing dates, categories and classes. A table of U.S. references, abstract, and the claims of the patent. Alternatively, the user may also click on the rank field of FIG. 9D and arrive at the patent viewer screen as depicted in FIG. 9F. The links to these various pages may be achieved using HTML or any other conventional method known to those having ordinary skill in the art.

The patent viewer screen of FIG. 9F enables the user to have a side-by-side comparison of the concept query entered and the text of various patents which match the concept query according to the system. The full text of these documents is presented simultaneously on a computer display, enabling the user to interactively explore a comparison of the two documents. The user can then indicate terms or phrases of interest, either by typing them into an input window or by highlighting them in the text. All occurrences of those terms or phrases in either document will be highlighted using graphical attributes such as color or font.

Figure 10A:
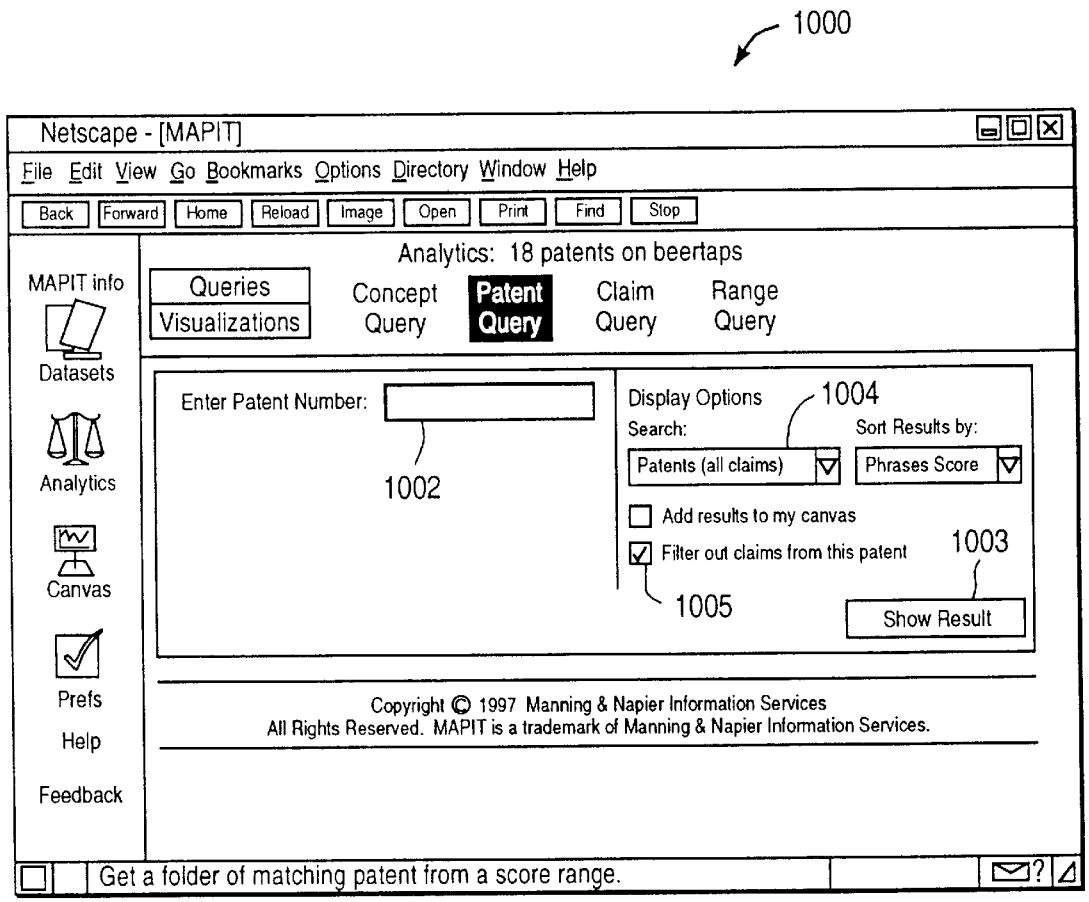
FIG. 10A illustrates a representative patent query screen according to a particular embodiment of the invention.

FIGS. 10A, B, C and D depict representative screens in accordance with the performing of a patent query as described hereinabove. The patent query allows the user to draw comparisons between a single patent and all other patents in the dataset. If the dataset is a single dataset, i.e., not a split dataset, the patent query will compare the selected patent to all of the patents in the selected dataset. If the selected dataset is a Split dataset (having two data groups), the selected patent is compared just to the group of patents that it is not in.

The patent query entry screen depicted in FIG. 10A enables the user to enter the number of a patent contained in the database of patents. The system will analyze all members of the database of patents against the patent entered. The patent query screen has fields which enable the user to select search processing for Best claim or All claims. In Best claim processing, the patent is compared to each individual claim in the selected dataset, or to each individual claim in the data group not containing the selected patent, and returns a results list ranked by patent. The patent score is the score of the highest ranked patent. In All Claims processing, the patent is compared to all of the combined claims for each patent in the selected dataset, or to an amalgamation of claims for each patent in the data group which the seleted patent does not belong to, and returns a results list that ranks each matching patent based on a score for all the claims in the patent.

Figure 10B:
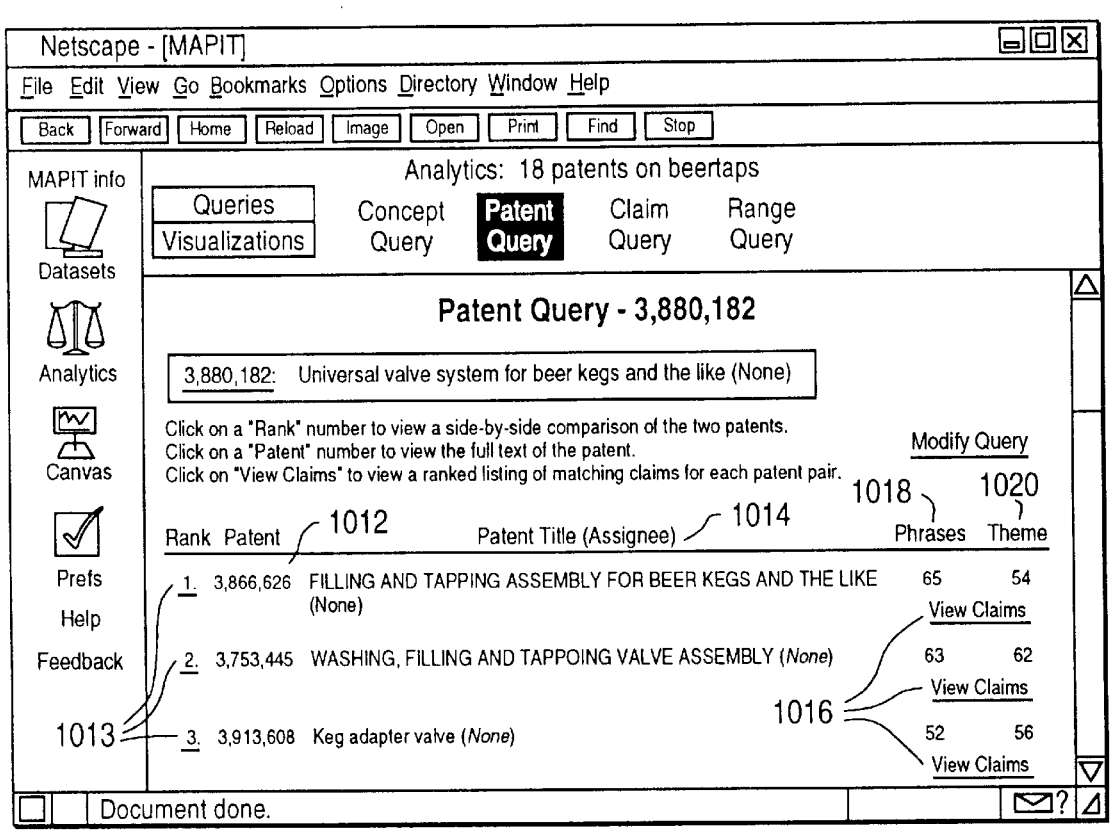
FIG. 10B illustrates a representative patent query results screen according to a particular embodiment of the invention.

The patent query results screen depicted in FIG. 10B gives the results of the user's search as applied to the database of patents. In the representative query depicted in FIG. 10B, the patents are listed in order of decreasing relevance to the user's query. Patents are ranked in numerical order and the patent number is given along with the title and an assignee. Next, the user may by clicking on the patent number, to move to a screen which displays the entire text of the patent.

Alternatively, the user may click on the "view claims" link to arrive at the claims comparison screen depicted in FIG. 10C. The claims comparison screen permits the user to have a side-by-side comparison of the claims in the two patents.

Figure 10D:
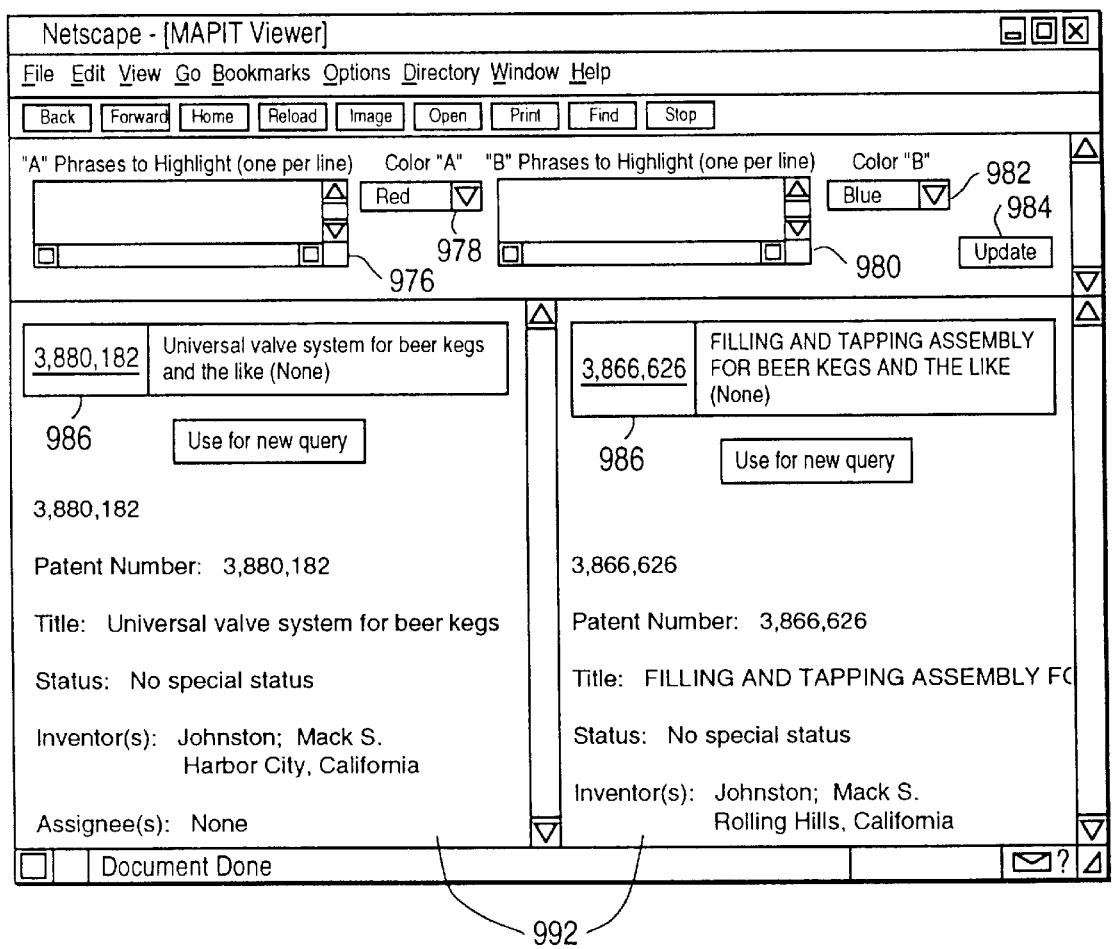
FIG. 10D illustrates a representative patent query side-by-side comparison screen of patents according to a particular embodiment of the invention.

Alternatively, the user may also click on the rank field of FIG. 10B and arrive at the side-by-side viewer screen as depicted in FIG. 10D. The patent viewer screen enables the user to have a side-by-side comparison of the two patents. The full text of these documents is presented simultaneously on a computer display, enabling the user to interactively explore a comparison of the two documents.

Figure 11A:
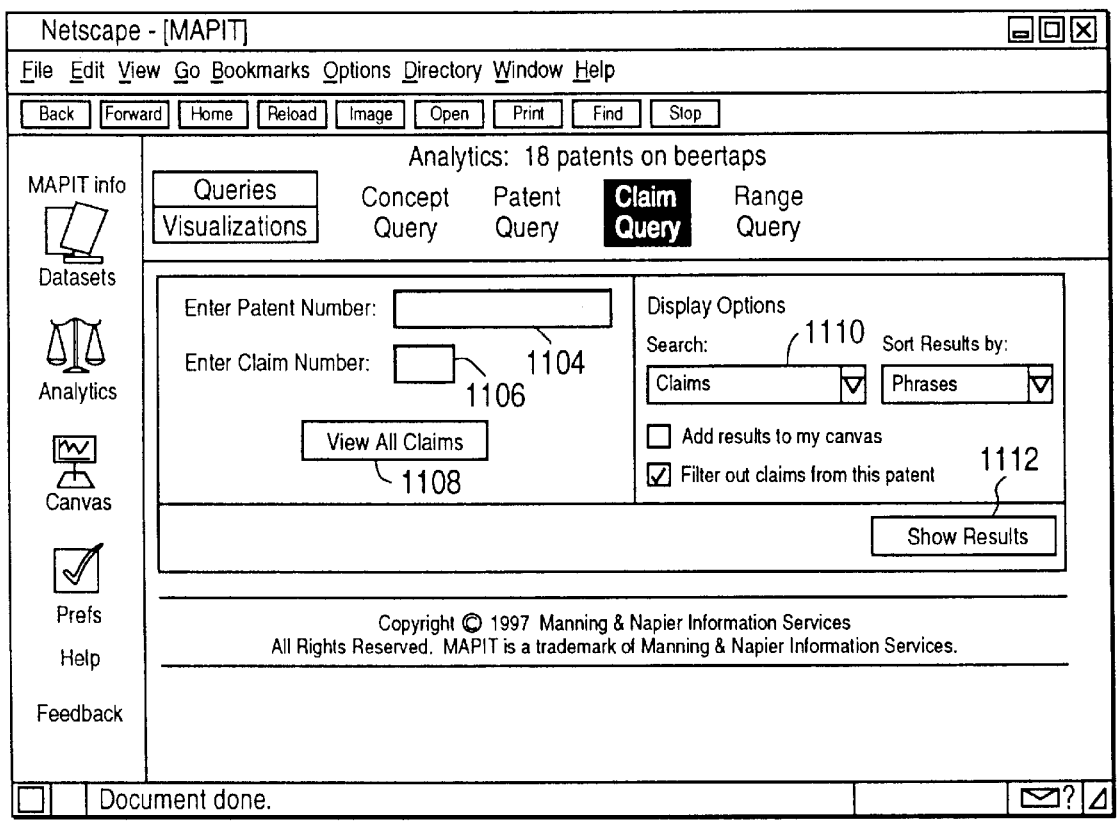
FIG. 11A illustrates a representative claim query screen according to a particular embodiment of the invention.
Figure 11B:
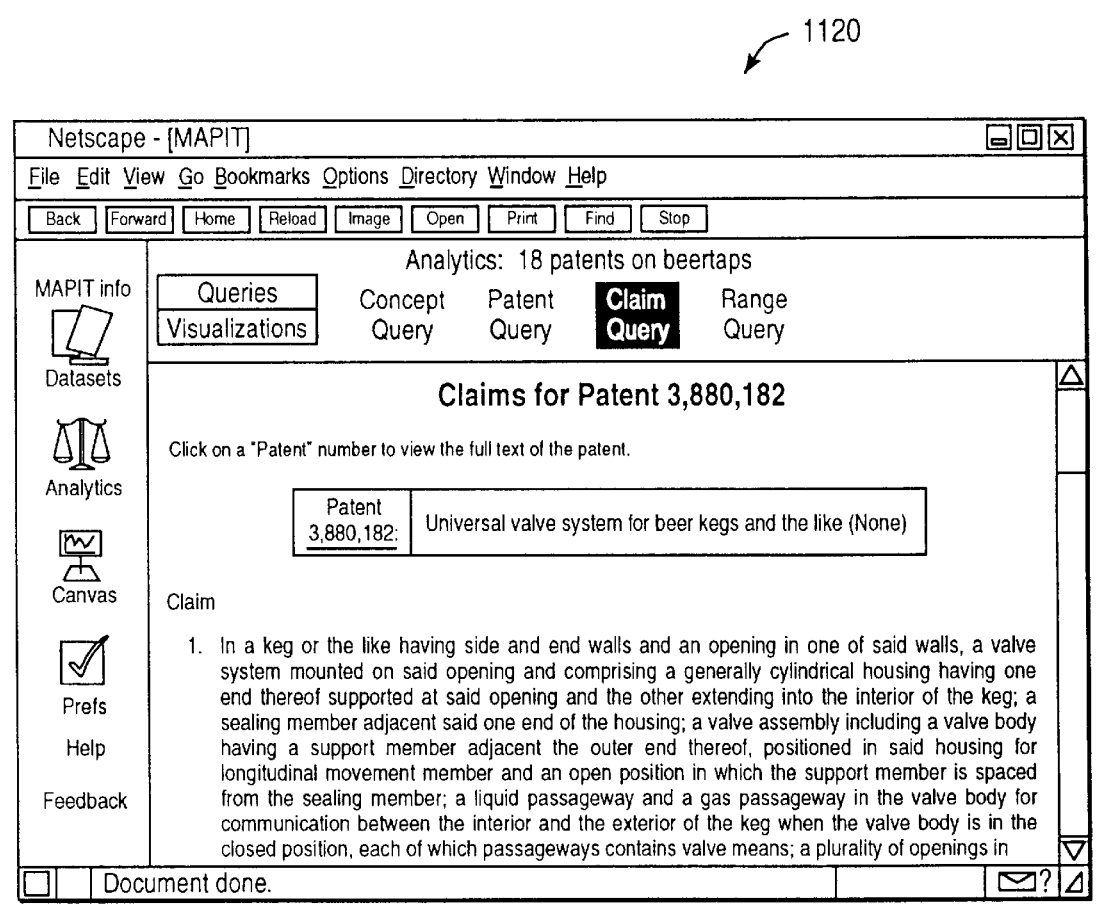
Figure 11C:
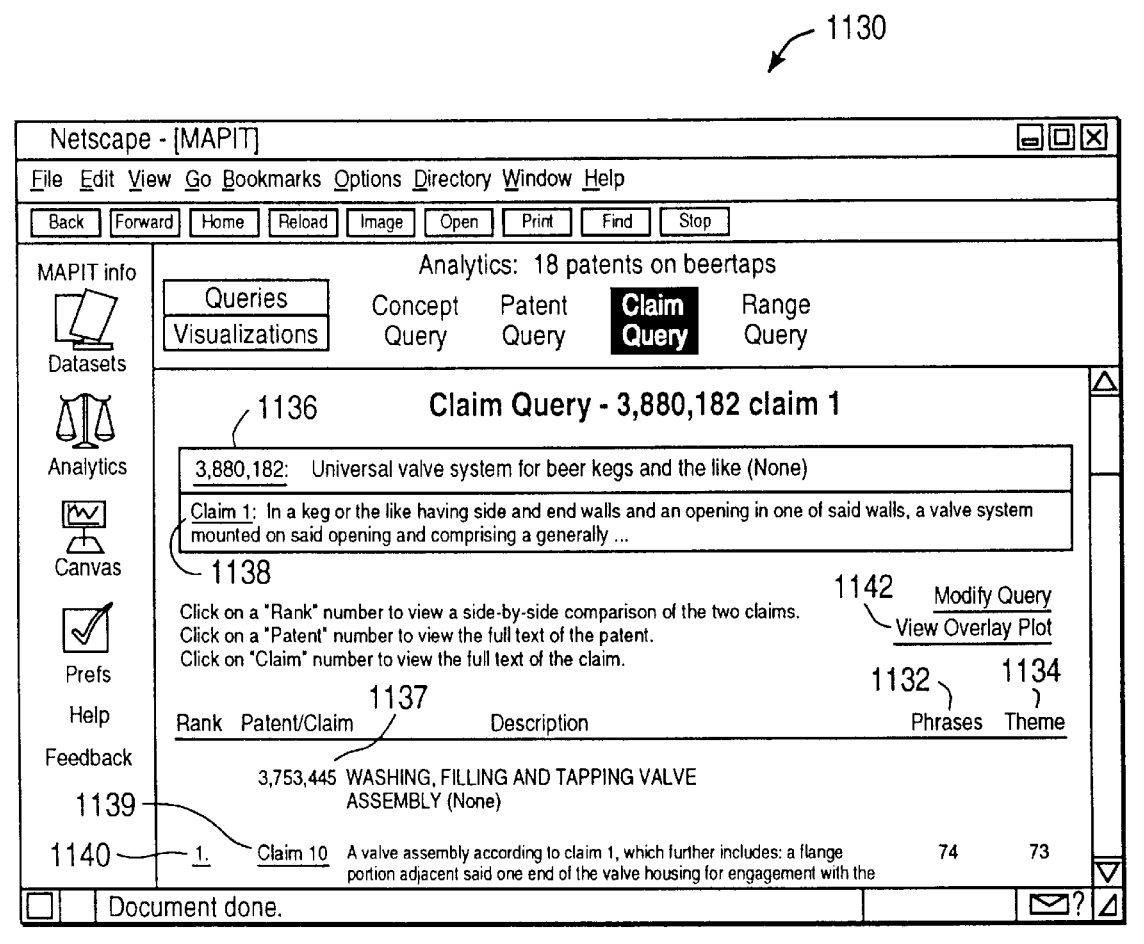
Figure 11D:
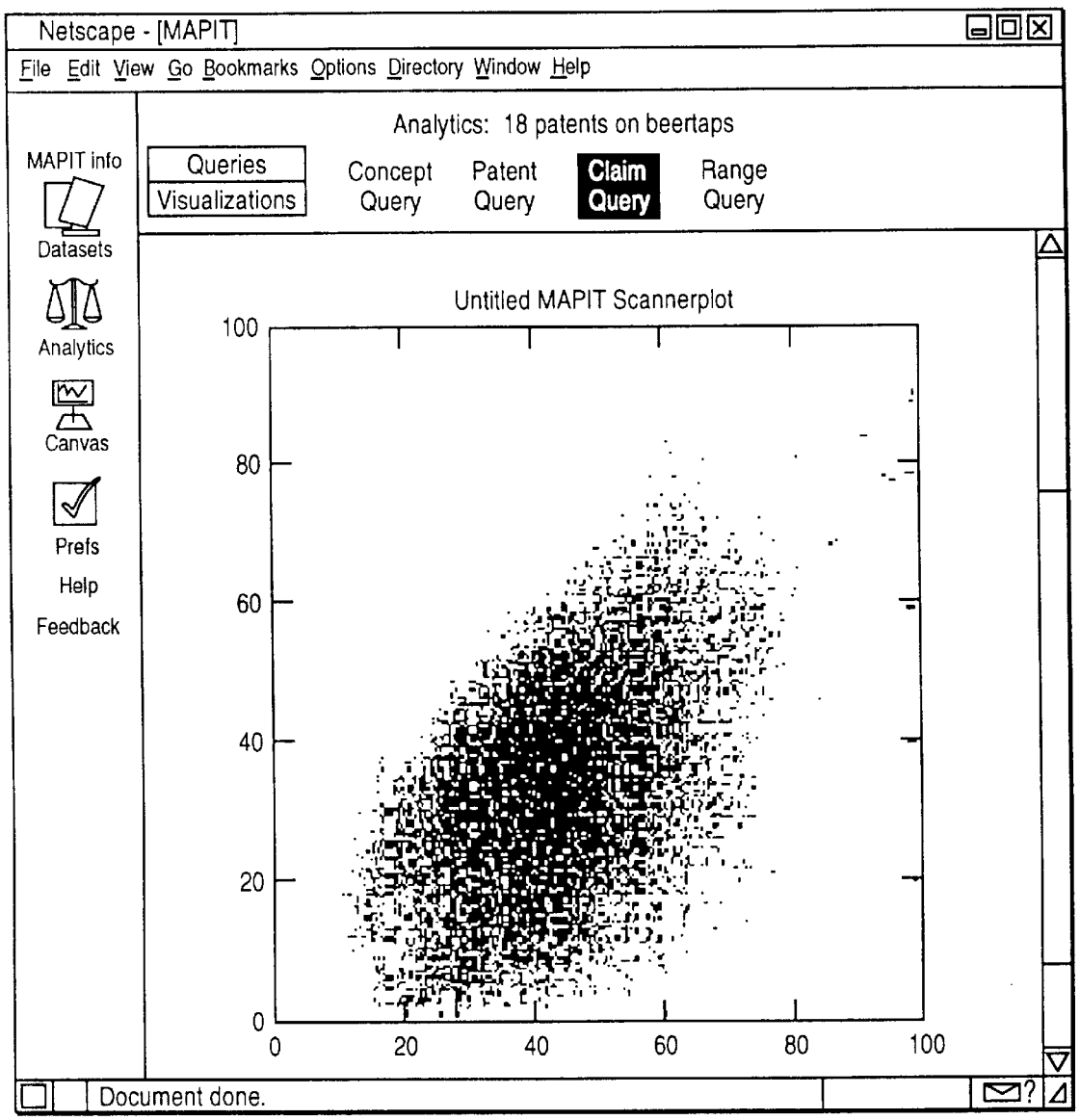
FIG. 11D illustrates a representative overlay plot for a claim query results screen according to a particular embodiment of the invention.

FIGS. 11A, B and C depict representative screens in accordance with the performing of a claim query as described hereinabove. The claim query allows the user to draw comparisons between a single claim and all other claims in the dataset. If the dataset is a single dataset, the claim query will compare the selected claim to all of the claims in the selected dataset. If the selected dataset is a Split set (having two data groups), the selected claim is compared just to the group of claims that it is not in.

The claim query entry screen depicted in FIG. 11A enables the user to enter the number of a patent and a claim contained in the database. The system will analyze all members of the database against the claim entered. A user who is unsure of the correct claim number to enter, may, after entering the patent number, click a "view claims" icon. The screen of FIG. 11B is displayed which displays the entire text of the claims for the patent corresponding to the patent number entered. The user can scroll through the claims until the desired claim is found.

Once the user has entered the desired claim and selected a "show results" icon, the system responds with matching claims in ranked order in a screen depicted in FIG. 11C. The user may click on a hyperlink rank indicator to perform a side-by-side comparison of the claims. Alternatively, the user can select the patent number to view the full text of the patent, or the claim number to view the full text of an individual claim in the viewer. Alternatively, the user can click on "view overlay plot" to view highlights of all the match points of the results over the top of a cluster plot.

Figure 11E:
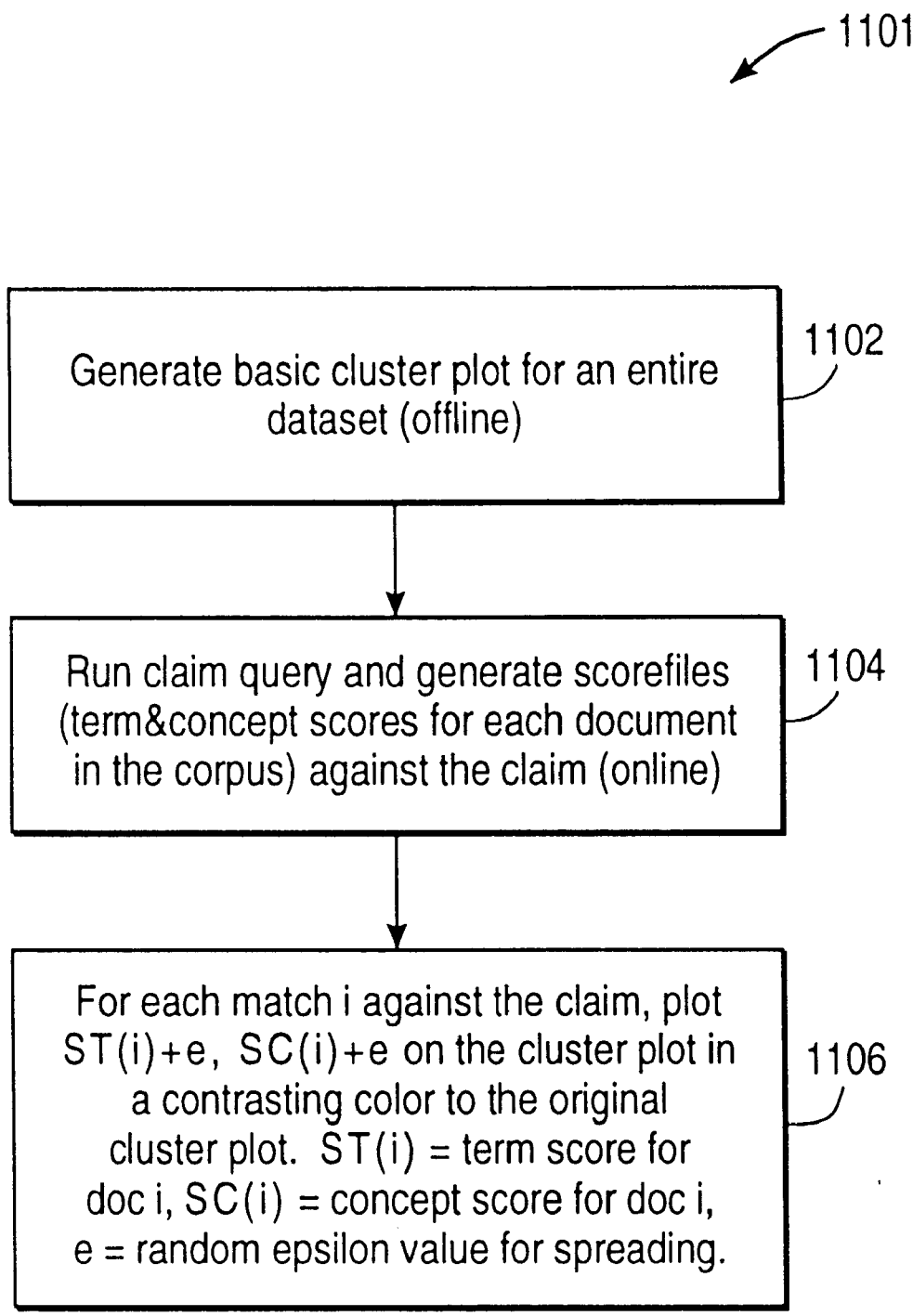
FIG. 11E is a flow chart depicting the steps for generating an overlay plot.

FIG. 11E depicts the steps in producing the overlay plot. First, as depicted by step 1102 of flow chart 1101, generate the basic cluster plot for an entire data set by offline processing as described hereinabove. Next, according to step 1104, run a claim query and generate score files, both term and concept scores, for each document in the data set against the claim (online) query. Finally, in step 1106, for each match against the claim i, plot $ST(i)+e$, $SC(i)+e$ on the cluster plot in a contrasting color to the original cluster plot; where in $ST(i)$ equals the term score for document i, $SC(i)$ equals the concept score for document(i), e equals a random epsilon value for spreading. The result is that the dots on the full cluster plot that correspond to the claim query are highlighted.

Figure 12A:
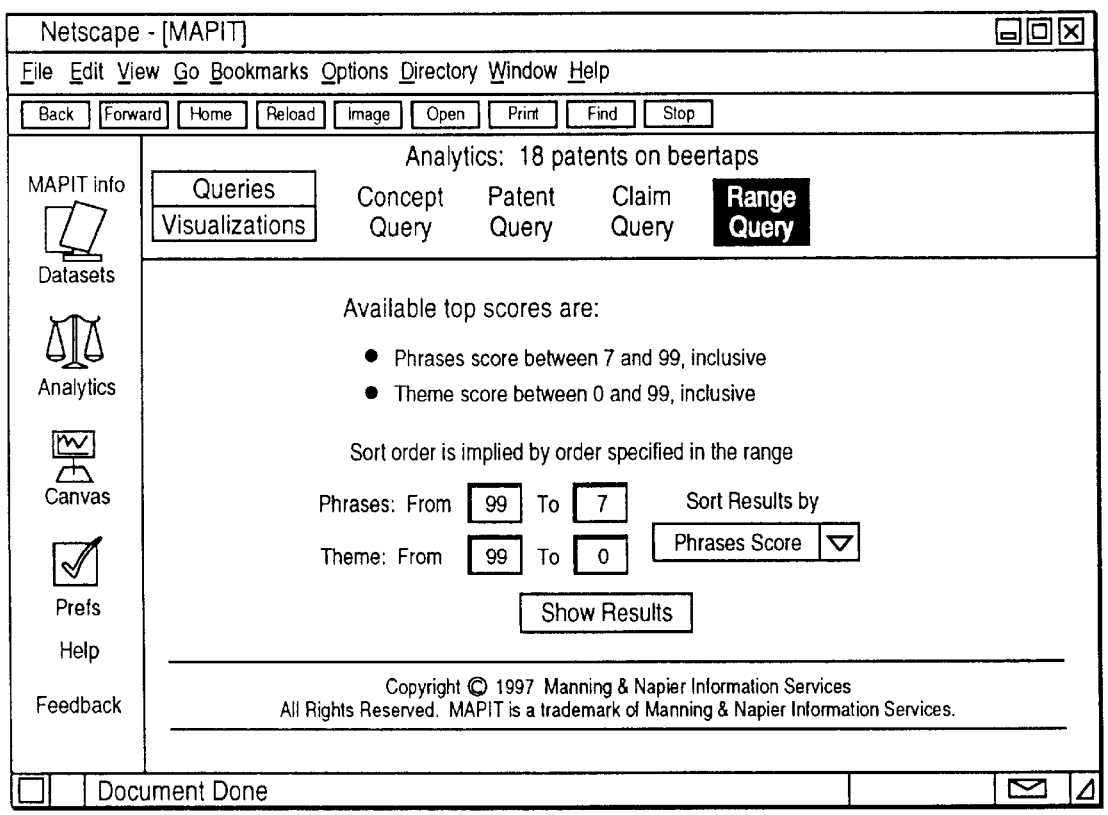
FIG. 12A illustrates a representative range query screen according to a particular embodiment of the invention.

FIGS. 12A and B depict representative screens in accordance with the performing of a range query. The range query allows the user to view claim pair matches in the dataset by specifying a score range. If the selected dataset is a single dataset the range of every claim in the dataset is compared to every other claim. If the set is a split set, every claim from the first data group will be compared to every claim from the second data group.

The range query entry screen depicted in FIG. 12A enables the user to enter a start value and end value for a phrase score and a theme score and then to select which score is to be used by the system in order to rank results.

Figure 12B:
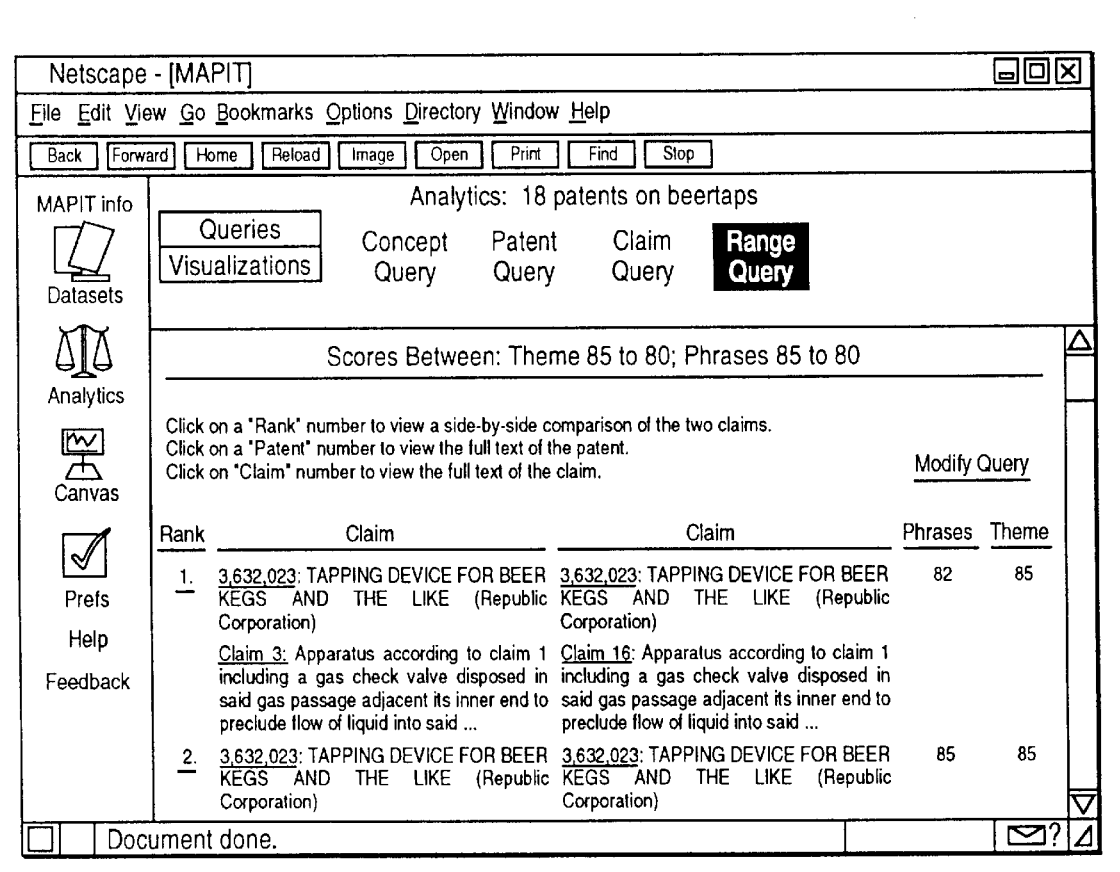

The system ranks the results in the range query as depicted in FIG. 12B. The results are listed by patent number, title, assignee information and the number of lines of each claim. By clicking on the rank number, the user can view a side-by-side comparison of the two claims in the viewer. Otherwise, by clicking on the patent number the viewer can view the full text of the patent in the viewer. Or, by clicking on the claim to view, the user may view the full text of the claim in the viewer.

Figure 12C:
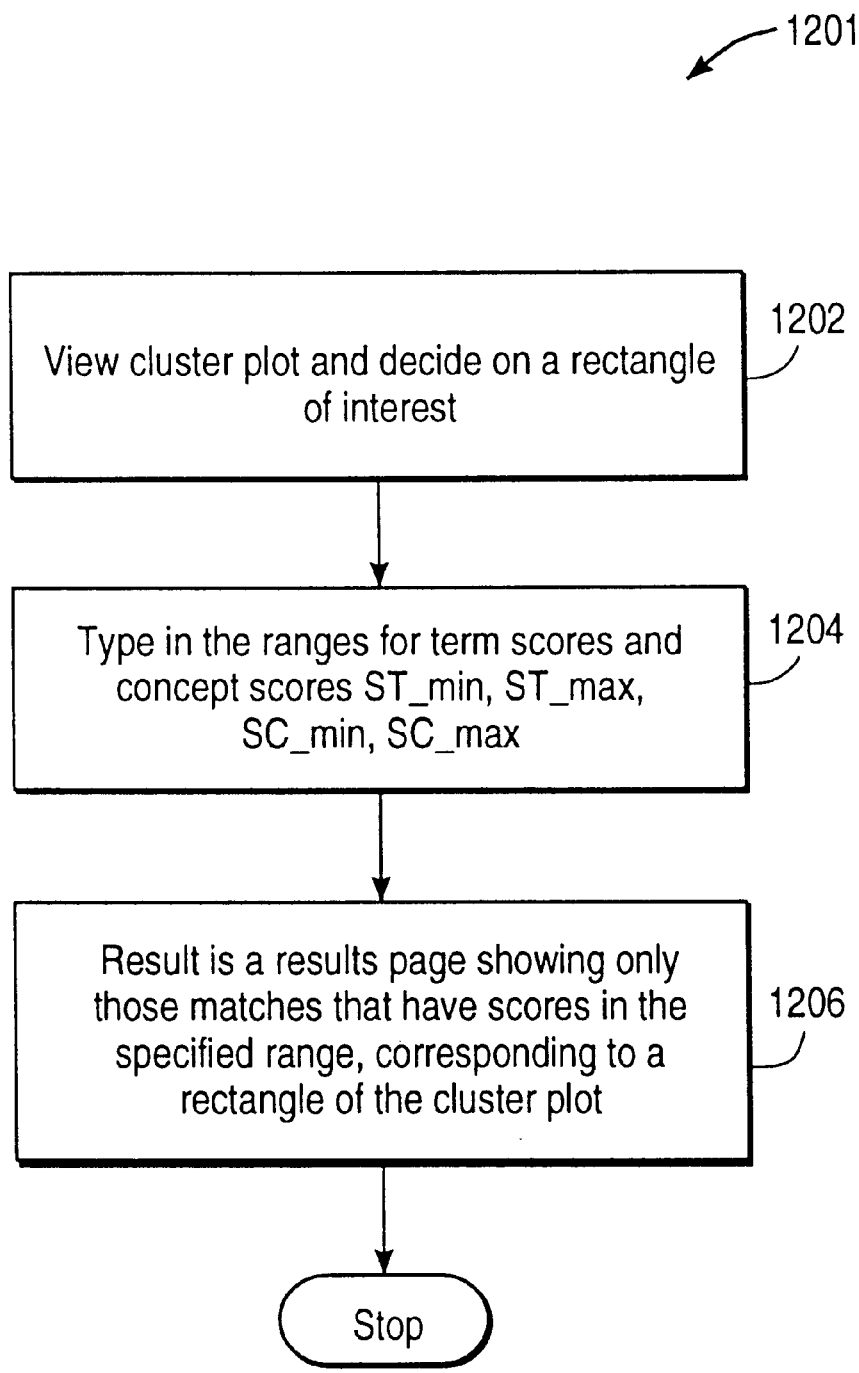
FIG. 12C is a flow chart depicting the steps for generating a range query.

FIG. 12C depicts steps in producing a range query. First, as shown in step 1202, the user views the cluster plot and decides on an area of interest determined by a rectangle. Next, in step 1204, the user enters the ranges for term scores and concepts scores ST_min, ST_max, SC_min, SC_max in accordance with the rectangular region of interest determined in prior step 1202. The result is a result page showing only the matches that have scores in the specified range corresponding to the rectangle of the cluster plot.

The automated highlighting in the user query screen enables the highlighting of documents displayed side-by-side on the same display where any occurrence of words or phrases from one or more predefined lists are highlighted visually. Automated highlighting may also be used where any occurrence of words or phrases specified by the user (or any words or phrases automatically generated by one or more sets of rules specified by the user) are highlighted visually.

In a related embodiment, the type of highlighting can be varied to indicate the list to which the highlighted word or phrase belongs, the words or phrases can be highlighted only when they occur in both documents.

While the foregoing is a complete description of a specific embodiment of the invention, various modifications, alternative constructions and equivalents will be apparent to one skilled in the art. Although aspects of the invention are described in terms examples of analyzing and visualizing patent texts, aspects of the invention are applicable to other classes of documents. Therefore, it is not intended that the invention be limited in any way except as defined by the claims.

What is claimed is:

1. A method of analyzing and displaying information regarding a plurality of documents, the method comprising the steps of:

generating a set of N different representations of each document, a given representation being designated the $i^{th}$ representation where i is an integer in the range of 1 to N inclusive;

for selected pairs of documents, determining N utility measures, a given utility measure being designated the $i^{th}$ utility measure where i is an integer in the range of 1 to N inclusive, the $i^{th}$ utility measure being based on the respective $i^{th}$ representations of the documents in that pair; and displaying a scatter plot in an area bounded by N non-parallel axes, a given axis being designated the $i^{th}$ axis where i is an integer in the range of 1 to N inclusive, where each selected pair is represented by a point in N-space having a coordinate along the $i^{th}$ axis equal to the $i^{th}$ utility measure.

2. The method of claim 1 wherein the set of N different representations comprises:

a first representation being a conceptual-level representation; and a second representation being a term-based representation.

3. The method of claim 2 wherein the utility measure is a proximity score.

4. A method of analyzing and displaying information regarding a plurality of documents, the method comprising the steps of:

generating first and second different representations of each document;

for selected pairs of documents, determining (a) a first utility measure based on the respective first representations of the documents in that pair, and (b) a second utility measure based on the respective second representations of the documents in that pair; and displaying a scatter plot in an area bounded by first and second non-parallel axes where each selected pair is represented by a point having a first coordinate along the first axis equal to the first utility measure and a second coordinate along the second axis equal to the second utility measure.

5. The method of claim 4 wherein:

the first representation is a conceptual-level representation; and the second representation is a term-based representation.

6. The method of claim 4 wherein:

the first representation is a subject vector; and the second representation is a word vector.

7. The method of claim 4 wherein each of the selected pairs consists of a particular document in the plurality of documents and a different respective one of the remaining documents in the plurality of documents.

8. The method of claim 5 wherein the utility measure is a proximity score.

9. The method of claim 4 wherein the documents are publications.

10. The method of claim 4 wherein the documents are articles from journals.

11. The method of claim 4 wherein the documents are attributable to a product.

12. The method of claim 4 wherein the documents are contained in a split dataset for making comparisons between collections of documents.

13. The method of claim 4 wherein the documents are different parts of patents.

14. The method of claim 13 wherein the different parts of patents include claims.

15. The method of claim 13 wherein the different parts of patents include a detailed description.

16. The method of claim 13 wherein the different parts of patents include an abstract.

17. The method of claim 13 wherein the different parts of patents include a summary.

18. The method of claim 13 wherein the different parts of patents include a Background of Invention.

19. A method of analyzing information regarding a plurality of documents, each having a unique document index, the method comprising the steps of:

parsing each document into a plurality of elements;

generating a first representation of each of said elements; and for selected pairs of documents, comprised of a first document and a second document, determining a first utility measure based on the respective first representation of the plurality of elements for the documents in that pair.

20. The method of claim 19, wherein said plurality of elements are in a hierarchical relationship, further comprising the step of:

displaying a representation of each of said plurality of elements reflecting said hierarchical relationship.

21. The method of claim 19 wherein said elements comprise patent claims.

22. The method of claim 20 wherein said representation is a hypertext link.

23. The method of claim 20 wherein said representation is a depiction of a sequence of said plurality of elements organized to reflect said hierarchical relationship.

24. The method of claim 19, wherein said plurality of elements are in a hierarchical relationship, further comprising the step of:

selecting a particular element from said plurality of elements as a basis for further analysis.

25. The method of claim 19 wherein the parsing step produces a transitive closure of said plurality of elements.

26. The method of claim 19 wherein the elements are claims and the parsing step comprises the steps of:

reading in text;

determining whether a new claim has begun;

tokenizing said text to extract a plurality of tokens;

adding said plurality of tokens to a word list for the claim; and scanning said tokenized text for tokens which indicate a reference to a different claim.

27. The method of claim 19 further comprising the step of displaying a plot in an area bounded by first and second non-parallel axes where each selected pair is represented by a point having a first coordinate along the first axis and a second coordinate along the second axis.

28. The method of claim 27 further comprising the steps of:

generating a second representation of each of said elements;

for the selected pairs of documents, determining a second utility measure based on the respective second representation of the plurality of elements for the documents in that pair; and wherein in the displaying step, the plot is a scatter plot, the first coordinate is equal to the first utility measure and the second coordinate is equal to the second utility measure.

29. The method of claim 19 further comprising the steps of:

generating a second representation of each of said elements;

for the selected pairs of documents, determining a second utility measure based on the respective second representation of the plurality of elements for the documents in that pair.

30. The method of claim 27 further comprising the steps of:

wherein in the displaying step, the plot is a 2 dimensional visualization, the first coordinate is equal to the unique document index of the first document of a pair of documents and the second coordinate is equal to the unique document index of the second member of a pair of documents, and an icon representing the first utility measure is plotted for each pair of documents.

31. The method of claim 19 further comprising the step of displaying a plot in an area bounded by first, second and third non-parallel axes where each selected pair is represented by a point having a first coordinate along the first axis, a second coordinate along the second axis and a third coordinate along the third axis.

32. The method of claim 31 further comprising the steps of:

wherein in the displaying step, the plot is a 3 dimensional visualization, the first coordinate is equal to the unique document index of the first document of a pair of documents and the second coordinate is equal to the unique document index of the second member of a pair of documents, and the third coordinate is equal to the first utility measure, and an icon representing the first utility measure is plotted for each pair of documents.

33. The method of claim 30 wherein said first utility measure is a combination of N utility measures.

34. The method of claim 32 wherein said first utility measure is a combination of N utility measures.

35. The method of claim 28, for an additional document further comprising:

parsing said additional document into a plurality of elements;

generating a first representation of each of said elements from the parsing step;

for selected pairs of documents drawn such that a first member of the pair is the additional document and a second member of the pair is from said plurality of documents, determining a first utility measure based on the respective first representation of the plurality of elements for the documents in that pair;

generating a second representation of each of said elements from the parsing step;

for selected pairs of documents drawn such that a first member of the pair is the additional document and a second member of the pair is from the plurality of documents, determining a second utility measure based on the respective second representation of the plurality of elements for the documents in that pair; and wherein in the displaying step, the plot is a scatter plot, generating an overlay plot in contrasting color to the scatter plot, the first coordinate equal to the first utility measure computed on the pairs of documents including the additional document the second coordinate is equal to the second utility measure computed on the pairs of documents including the additional document.

36. The method of claim 35 wherein said additional document is a textual query entered by a user.

37. The method of claim 35 wherein:

the first representation is a conceptual-level representation; and the second representation is a term-based representation.

38. The method of claim 37 wherein:

the first representation is a subject vector; and the second representation is a word vector.

39. The method of claim 19 wherein said step of determining a first utility measure further comprises the steps of:

determining a first intermediate utility measure;

determining a second intermediate utility measure;

selecting a particular intermediate utility measure from said first intermediate utility measure and said second intermediate utility measure as said first utility measure.

40. The method of claim 29 wherein said step of determining a second utility measure further comprises the following steps:

determining a third intermediate utility measure;

determining a fourth intermediate utility measure;

selecting a particular intermediate utility measure from said third intermediate utility measure and said fourth intermediate utility measure as said second utility measure.

41. The method of claim 39 wherein:

said first intermediate utility measure is a combination of a first similarity measure for said first document element and said first similarity measure for said second document element and a first normalization constant; and said second intermediate utility measure is a combination of a first similarity measure for said second document element and said first similarity measure for said first document element and a second normalization constant.

42. The method of claim 40 wherein:

(a) said third intermediate utility measure is a combination of a second similarity measure for said first document element and said second similarity measure for said second document element and a first normalization constant; and (b) said fourth intermediate utility measure is a combination of said second similarity measure for said second document element and said second similarity measure for said first document element and a second normalization constant.

43. The method of claim 41 wherein said first similarity measure is a word weight vector.

44. The method of claim 42 wherein said second similarity measure is an SFC weight vector.

45. The method of claim 19 wherein:

said pairs of documents further comprises a first document and a second document, said first document is a dependent claim, x, depending from an independent claim, X, and said second document is a dependent claim, y, depending from an independent claim, Y, said determining a first utility measure further comprises the following steps:

determining a first intermediate utility measure;

determining a second intermediate utility measure;

combining said first intermediate utility measure and said second intermediate utility measure.

46. The method of claim 29 wherein:

said pairs of documents further comprises a first document and a second document, said first document is a dependent claim, x, depending from an independent claim, X, and said second document is a dependent claim, y, depending from an independent claim, Y, said determining a second utility measure further comprises the following steps:

determining a third intermediate utility measure;

determining a fourth intermediate utility measure;

combining said third intermediate utility measure and said fourth intermediate utility measure.

47. The method of claim 45 wherein:

(a) said first intermediate utility measure is a combination of a first similarity measure for said first document element, x, and said first similarity measure for said second document element Y; and (b) said second intermediate utility measure is a combination of said first similarity measure for said first document element, X, and said first similarity measure for said second document element, Y.

48. The method of claim 46 wherein:

(a) said third intermediate utility measure is a combination of said second similarity measure for said first document element, x, and said second similarity measure for said second document element Y; and (b) said fourth intermediate utility measure is a combination of said second similarity measure for said first document element, X, and said second similarity measure for said second document element, Y.

49. The method of claim 47 wherein said first similarity measure is a word weight vector.

50. The method of claim 48 wherein said second similarity measure an SFC weight vector.

51. The method of claim 45 wherein said step of combining comprises an averaging.

52. The method of claim 46 wherein said step of combining comprises an averaging.

53. A computer program product which analyzes and displays information regarding a plurality of documents comprising:
   code for generating first and second representations of each document;
   code for determining, for selected pairs of documents;
      (a) a first utility score based on the respective first representations of the documents in that pair, and
      (b) a second utility score based on the respective second representations of the documents in that pair;
   code for displaying a scatter plot in an area bounded by a first and a second non-parallel axes where each selected pair is represented by a point having a first coordinate along the first axis equal to the first utility score and a second coordinate along the second axis equal to the second utility score; and
   a computer readable storage medium for storing the codes.

54. A method of analyzing patent documents comprising the steps of:
   providing a dataset containing a plurality of patent documents;
   identifying within each patent document a portion of said document containing a set of claims;
   generating a first representation of each set of claims within said plurality of patent documents; and
   determining a first utility measure of at least one claim within at least one set of claims based upon similarity of said at least one claim with a query document.

55. The method of claim 54 wherein said query document is a concept query, patent or claim.

56. The method of claim 54 further comprising the step of displaying on a computer screen a ranking of a plurality of claims contained within said patent documents based upon said first utility measure associated with each of said plurality of claims, said screen including a claim number and rank number for each of said plurality of claims.

57. The method of claim 56 further comprising the step of providing a link at said claim number to a full-text display of an associated claim.

58. The method of claim 57 further comprising the step of providing a link at said rank number to a side-by-side textual display of said associated claim and said query document.

59. The method of claim 54 further comprising the step of parsing each set of claims to identify each individual claim within said each set and all claims referenced by said each individual claim.

60. The method of claim 54 further comprising the steps of:
   generating a second representation of each set of claims within said plurality of patent documents; and
   determining a second utility measure of said at least one claim within said at least one set of claims based upon similarity of said at least one claim with said query document.

61. The method of claim 60 further comprising the step of displaying on a computer screen a ranking of said plurality of patent documents based upon said first and second utility measures associated with claims of each of said patent documents, said screen including a rank number for each of said plurality of patent documents.

62. The method of claim 61 further comprising the step of providing a link at said rank number to a side-by-side textual display of an associated patent document and said query document.

63. The method of claim 62 further comprising the step of providing a link at a screen icon to a textual display of a ranked listing of matching claims of said associated patent document and said query document.

64. A method of analyzing a patent document comprising the steps of:
   providing a dataset containing at least one patent document;
   identifying within said at least one patent document a portion of said document containing a set of claims;
   parsing said set of claims to identify an individual claim within said set and all claims referenced by said individual claim; and
   displaying on a computer screen a link for each claim referenced by said individual claim.

65. The method of claim 64 further comprising the step of displaying on said computer screen at least a portion of said individual claim.

66. The method of claim 65 wherein activation of said link for a particular claim referenced by said individual claim produces a full text display of said particular claim.

67. The method of claim 66 wherein said link is a claim number.

68. The method of claim 67 wherein said full text display of said particular claim comprises a transitive closure of said particular claim.

* * * * *

UNITED STATES PATENT AND TRADEMARK OFFICE
CERTIFICATE OF CORRECTION

| | | |
|---|---|---|
| PATENT NO. | : 6,038,561 | Page 1 of 1 |
| APPLICATION NO. | : 08/929603 | |
| DATED | : March 14, 2000 | |
| INVENTOR(S) | : David L. Snyder et al. | |

It is certified that error appears in the above-identified patent and that said Letters Patent is hereby corrected as shown below:

Additional names of inventors to be added to Letters Patent:

On the title page [75] Item insert

Edmund Szu-Li Yu, New York

Michael Weiner, New York

Elizabeth D. Liddy, New York--

Signed and Sealed this

Seventeenth Day of July, 2007

JON W. DUDAS
*Director of the United States Patent and Trademark Office*